United States Patent
Kusafuka

(10) Patent No.: US 11,924,400 B2
(45) Date of Patent: Mar. 5, 2024

(54) THREE-DIMENSIONAL DISPLAY DEVICE, CONTROL CONTROLLER, THREE-DIMENSIONAL DISPLAY METHOD, THREE-DIMENSIONAL DISPLAY SYSTEM, AND MOVING BODY

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 545 days.

(21) Appl. No.: 17/255,344

(22) PCT Filed: Jun. 21, 2019

(86) PCT No.: PCT/JP2019/024750
§ 371 (c)(1),
(2) Date: Dec. 22, 2020

(87) PCT Pub. No.: WO2020/044275
PCT Pub. Date: Jan. 2, 2020

(65) Prior Publication Data
US 2021/0274157 A1    Sep. 2, 2021

(30) Foreign Application Priority Data
Jun. 26, 2018 (JP) .................... 2018-121369

(51) Int. Cl.
*H04N 13/363* (2018.01)
*B60K 35/00* (2006.01)
(Continued)

(52) U.S. Cl.
CPC ........... *H04N 13/363* (2018.05); *B60K 35/00* (2013.01); *H04N 13/31* (2018.05); *H04N 13/383* (2018.05);
(Continued)

(58) Field of Classification Search
CPC ...... B60K 2370/149; B60K 2370/1529; B60K 2370/1531; B60K 35/00; G02B 30/28;
(Continued)

(56) References Cited

U.S. PATENT DOCUMENTS 8,704,883 B2 * 4/2014 Lee ...................... H04N 13/144
348/42
2011/0221750 A1 9/2011 Sato et al.
(Continued)

FOREIGN PATENT DOCUMENTS

EP    2 693 759 A2    2/2014
JP    2001-166259 A    6/2001
(Continued)

*Primary Examiner* — Kathleen M Walsh
(74) *Attorney, Agent, or Firm* — Studebaker & Brackett PC

(57) ABSTRACT

A three-dimensional display device includes a display panel, an optical element, an acquisition unit, and a controller. The display panel includes an active area. The optical element defines a light beam direction of image light emitted from the active area. The acquisition unit acquires a position of a first eye of a user and a position of a second eye of the user. The controller drives the active area to display the image mixture. The active area includes a plurality of subpixels. The controller determines a first visible region. The controller determines a second visible region. The controller determines a first subpixel based on the first visible region. The controller determines a second subpixel based on the second visible region. The controller drives a third subpixel which is the first subpixel and also is the second subpixel, to display a third image.

17 Claims, 24 Drawing Sheets

(51) Int. Cl.
*H04N 13/31* (2018.01)
*H04N 13/383* (2018.01)

(52) U.S. Cl.
CPC .............. *B60K 2370/149* (2019.05); *B60K 2370/1529* (2019.05); *B60K 2370/1531* (2019.05)

(58) Field of Classification Search
CPC ........ G02B 30/30; G02B 30/31; H04N 13/31; H04N 13/317; H04N 13/363; H04N 13/366; H04N 13/383
USPC .......................................................... 348/51
See application file for complete search history.

(56) References Cited

U.S. PATENT DOCUMENTS

| | | | |
|---|---|---|---|
| 2013/0257928 A1 | 10/2013 | Lee | |
| 2014/0091991 A1* | 4/2014 | An | H04N 13/305 345/32 |
| 2014/0152663 A1* | 6/2014 | Aoki | H04N 13/376 345/426 |
| 2014/0267242 A1* | 9/2014 | Uehara | G02B 27/0093 345/419 |
| 2014/0340746 A1* | 11/2014 | Watanabe | G09G 3/003 359/464 |
| 2015/0091897 A1* | 4/2015 | Park | H04N 13/383 359/465 |
| 2015/0145977 A1* | 5/2015 | Hoffman | H04N 13/302 348/54 |
| 2016/0055818 A1* | 2/2016 | Kim | G11C 19/287 345/95 |
| 2017/0041596 A1* | 2/2017 | Park | H04N 13/305 |
| 2017/0264891 A1* | 9/2017 | Iwasaki | H04N 13/373 |
| 2018/0063502 A1* | 3/2018 | Ogawa | H04N 13/31 |
| 2019/0266974 A1* | 8/2019 | Chen | G09G 3/3625 |
| 2020/0387005 A1* | 12/2020 | Kakeya | H04N 13/324 |
| 2021/0281825 A1 | 9/2021 | Kusafuka et al. | |

FOREIGN PATENT DOCUMENTS

| | | |
|---|---|---|
| JP | 2011-091482 A | 5/2011 |
| JP | 2014-110568 A | 6/2014 |
| JP | 2014-112838 A | 6/2014 |
| WO | 2010061689 A1 | 6/2010 |
| WO | 2013047099 A1 | 4/2013 |
| WO | 2014136144 A1 | 9/2014 |
| WO | 2020/004258 A1 | 1/2020 |

* cited by examiner

FIG. 9

| | P1 | P2 | P3 | P4 | P5 | P6 | P7 | P8 | P9 | P10 | P11 | P12 |
|---|---|---|---|---|---|---|---|---|---|---|---|---|
| 0 | LEFT | LEFT | LEFT | LEFT | LEFT | LEFT | RIGHT | RIGHT | RIGHT | RIGHT | RIGHT | RIGHT |
| 1 | RIGHT | LEFT | LEFT | LEFT | LEFT | LEFT | LEFT | RIGHT | RIGHT | RIGHT | RIGHT | RIGHT |
| 2 | RIGHT | RIGHT | LEFT | LEFT | LEFT | LEFT | LEFT | LEFT | RIGHT | RIGHT | RIGHT | RIGHT |
| 3 | RIGHT | RIGHT | RIGHT | LEFT | LEFT | LEFT | LEFT | LEFT | LEFT | RIGHT | RIGHT | RIGHT |
| 4 | RIGHT | RIGHT | RIGHT | RIGHT | LEFT | LEFT | LEFT | LEFT | LEFT | LEFT | RIGHT | RIGHT |
| 5 | RIGHT | RIGHT | RIGHT | RIGHT | RIGHT | LEFT | LEFT | LEFT | LEFT | LEFT | LEFT | RIGHT |
| 6 | RIGHT | RIGHT | RIGHT | RIGHT | RIGHT | RIGHT | LEFT | LEFT | LEFT | LEFT | LEFT | LEFT |
| 7 | LEFT | RIGHT | RIGHT | RIGHT | RIGHT | RIGHT | RIGHT | LEFT | LEFT | LEFT | LEFT | LEFT |
| 8 | LEFT | LEFT | RIGHT | RIGHT | RIGHT | RIGHT | RIGHT | RIGHT | LEFT | LEFT | LEFT | LEFT |
| 9 | LEFT | LEFT | LEFT | RIGHT | RIGHT | RIGHT | RIGHT | RIGHT | RIGHT | LEFT | LEFT | LEFT |
| 10 | LEFT | LEFT | LEFT | LEFT | RIGHT | RIGHT | RIGHT | RIGHT | RIGHT | RIGHT | LEFT | LEFT |
| 11 | LEFT | LEFT | LEFT | LEFT | LEFT | RIGHT | RIGHT | RIGHT | RIGHT | RIGHT | RIGHT | LEFT |

FIG. 10

|    | 6 | 7 | 8 | 9 | 10 | 11 | 0 | 1 | 2 | 3 | 4 | 5 |
|----|---|---|---|---|----|----|---|---|---|---|---|---|
| 0  |   | P2~P6 | P3~P6 | P4~P6 | P5~P6 | P6 | – | P1 | P1~P2 | P1~P3 | P1~P4 | P1~P5 |
| 1  | P2~P6 |   | P3~P7 | P4~P7 | P5~P7 | P6~P7 | P7 | – | P2 | P2~P3 | P2~P4 | P2~P5 |
| 2  | P3~P6 | P3~P7 |   | P4~P8 | P5~P8 | P6~P8 | P7~P8 | P8 | – | P3 | P3~P4 | P3~P5 |
| 3  | P4~P6 | P4~P7 | P4~P8 |   | P5~P9 | P6~P9 | P7~P9 | P8~P9 | P9 | – | P4 | P4~P5 |
| 4  | P5~P6 | P5~P7 | P5~P8 | P5~P9 |   | P6~P10 | P7~P10 | P8~P10 | P9~P10 | P10 | – | P5 |
| 5  | P6 | P6~P7 | P6~P8 | P6~P9 | P6~P10 |   | P7~P11 | P8~P11 | P9~P11 | P10~P11 | P11 | – |
| 6  | – | P7 | P7~P8 | P7~P9 | P7~P10 | P7~P11 |   | P8~P12 | P9~P12 | P10~P12 | P11~P12 | P12 |
| 7  | P1 | – | P8 | P8~P9 | P8~P10 | P8~P11 | P8~P12 |   | P9~P12 | P10~P12 | P11~P12 | P1, P12 |
| 8  | P1~P2 | P2 | – | P9 | P9~P10 | P9~P11 | P9~P12 | P9~P13 |   | P1, P10~P12 | P1, P11~P12 | P1~P2, P12 |
| 9  | P1~P3 | P2~P3 | P3 | – | P10 | P10~P11 | P10~P12 | P1, P10~P12 | P1~P2, P10~P12 |   | P1~P2, P11~P12 | P1~P3, P12 |
| 10 | P1~P4 | P2~P4 | P3~P4 | P4 | – | P11 | P11~P12 | P1, P11~P12 | P1~P2, P11~P12 | P1~P3, P11~P12 |   | P1~P4, P12 |
| 11 | P1~P5 | P2~P5 | P3~P5 | P4~P5 | P5 | – | P12 | P1, P12 | P1~P2, P12 | P1~P3, P12 | P1~P4, P12 |   |

THREE-DIMENSIONAL DISPLAY DEVICE, CONTROL CONTROLLER, THREE-DIMENSIONAL DISPLAY METHOD, THREE-DIMENSIONAL DISPLAY SYSTEM, AND MOVING BODY

CROSS-REFERENCE TO RELATED APPLICATION

This application claims priority to Japanese Patent Application No. 2018-121369, which was filed on Jun. 26, 2018, the contents of which are incorporated herein by reference in its entirety.

TECHNICAL FIELD

The present disclosure relates to a three-dimensional display device, a control controller, a three-dimensional display method, a three-dimensional display system, and a moving body.

BACKGROUND

There is a heretofore known three-dimensional display device designed for three-dimensional display without the need for eyeglasses, which includes an optical element that enables a part of light emitted from a display panel to reach a right eye, and enables other part of the light emitted from the display panel to reach a left eye (refer to Japanese Unexamined Patent Publication JP-A 2001-166259 (Patent Literature 1)).

SUMMARY

A three-dimensional display device according to the disclosure includes a display panel, an optical element, an acquisition unit, and a controller. The display panel includes an active area for display of an image mixture including a first image and a second image which exhibits parallax with respect to the first image. The optical element is configured to define a light beam direction of image light emitted from the active area. The acquisition unit is configured to acquire a position of a first eye of a user and a position of a second eye of the user, the second eye differing from the first eye. The controller is configured to drive the active area to display the image mixture on a basis of the position of the first eye and the position of the second eye. The active area includes a plurality of subpixels. The controller is configured to determine a first visible region within the active area, for emitting image light which propagates to the position of the first eye. The controller is configured to determine a second visible region within the active area, for emitting image light which propagates to the position of the second eye. The controller is configured to determine, based on the first visible region, a first subpixel intended to display the first image from among the plurality of subpixels. The controller is configured to determine, based on the second visible region, a second subpixel intended to display the second image from among the plurality of subpixels. The controller is configured to drive a third subpixel which is the first subpixel and also is the second subpixel, to display a third image.

A control controller according to the disclosure is configured to drive an active area including a plurality of subpixels to display an image mixture including a first image and a second image which exhibits parallax with respect to the first image in accordance with a position of a first eye of a user and a position of a second eye of the user, the second eye differing from the first eye. The control controller is configured to determine a first visible region within the active area, for emitting image light which propagates to the position of the first eye. The control controller is configured to determine a second visible region within the active area, for emitting image light which propagates to the position of the second eye. The control controller is configured to determine, based on the first visible region, a first subpixel intended to display the first image from among the plurality of subpixels. The control controller is configured to determine, based on the second visible region, a second subpixel intended to display the second image from among the plurality of subpixels. The control controller is configured to drive a third subpixel which is the first subpixel and also is the second subpixel, to display a third image.

A three-dimensional display method according to the disclosure is a three-dimensional display method which is carried out by a three-dimensional display device. The three-dimensional display device includes a display panel, an optical element, an acquisition unit, and a controller. The display panel includes an active area including a plurality of subpixels, for displaying an image mixture including a first image and a second image which exhibits parallax with respect to the first image. The optical element defines a light beam direction of image light emitted from the active area. The acquisition unit acquires a position of a first eye of a user and a position of a second eye of the user, the second eye differing from the first eye. The controller drives the active area to display an image mixture in accordance with the position of the first eye and the position of the second eye. The controller determines a first visible region within the active area, for emitting image light which propagates to the position of the first eye. The controller determines a second visible region within the active area, for emitting image light which propagates to the position of the second eye. The controller determines, based on the first visible region, a first subpixel intended to display the first image from among the plurality of subpixels. The controller determines, based on the second visible region, a second subpixel intended to display the second image from among the plurality of subpixels. The controller drives a third subpixel which is the first subpixel and also is the second subpixel, to display a third image.

A three-dimensional display system according to the disclosure includes a detection device and a three-dimensional display device. The detection device detects a position of a first eye of a user and a position of a second eye of the user, the second eye differing from the first eye. The three-dimensional display device includes a display panel, an optical element, an acquisition unit, and a controller. The display panel includes an active area for display of an image mixture including a first image and a second image which exhibits parallax with respect to the first image. The optical element is configured to define a light beam direction of image light emitted from the active area. The acquisition unit is configured to acquire a position of a first eye of a user and a position of a second eye of the user, the second eye differing from the first eye. The controller is configured to drive the active area to display an image mixture in accordance with the position of the first eye and the position of the second eye. The active area includes a plurality of subpixels. The controller is configured to determine a first visible region within the active area, for emitting image light which propagates to the position of the first eye. The controller is configured to determine a second visible region within the active area, for emitting image light which propagates to the position of the second eye. The controller is configured to determine, based on the first visible region, a first subpixel intended to display the first image from among the plurality of subpixels. The controller is configured to determine, based on the second visible region, a second subpixel intended to display the second image from among the plurality of subpixels. The controller is configured to drive a third subpixel which is the first subpixel and also is the second subpixel, to display a third image.

A moving body according to the disclosure includes a three-dimensional display device. The three-dimensional display device includes a display panel, an optical element, an acquisition unit, and a controller. The display panel includes an active area for display of an image mixture including a first image and a second image which exhibits parallax with respect to the first image. The optical element is configured to define a light beam direction of image light emitted from the active area. The acquisition unit is configured to acquire a position of a first eye of a user and a position of a second eye of the user, the second eye differing from the first eye. The controller is configured to drive the active area to display an image mixture in accordance with the position of the first eye and the position of the second eye. The active area includes a plurality of subpixels. The controller is configured to determine a first visible region within the active area, for emitting image light which propagates to the position of the first eye. The controller is configured to determine a second visible region within the active area, for emitting image light which propagates to the position of the second eye. The controller is configured to determine, based on the first visible region, a first subpixel intended to display the first image from among the plurality of subpixels. The controller is configured to determine, based on the second visible region, a second subpixel intended to display the second image from among the plurality of subpixels. The controller is configured to drive a third subpixel which is the first subpixel and also is the second subpixel, to display a third image.

BRIEF DESCRIPTION OF DRAWINGS

FIG. 9 is a view showing an example of an image table indicating a correspondence between the position of the left eye and the position of the right eye, and an image to be displayed via each pixel under conditions where an inter-eye distance is a standard distance;

FIG. 10 is a view showing an example of a superimposition table indicating a correspondence between the position of the left eye and the position of the right eye, and the binocularly visible region;

DETAILED DESCRIPTION

The capability to allow users to view three-dimensional images properly is demanded in a three-dimensional display device of the related art.

The disclosure provides a three-dimensional display device, a control controller, a three-dimensional display method, a three-dimensional display system, and a moving body that allow users to view three-dimensional images properly.

An embodiment of the disclosure will now be described with reference to drawings.

Figure 1:
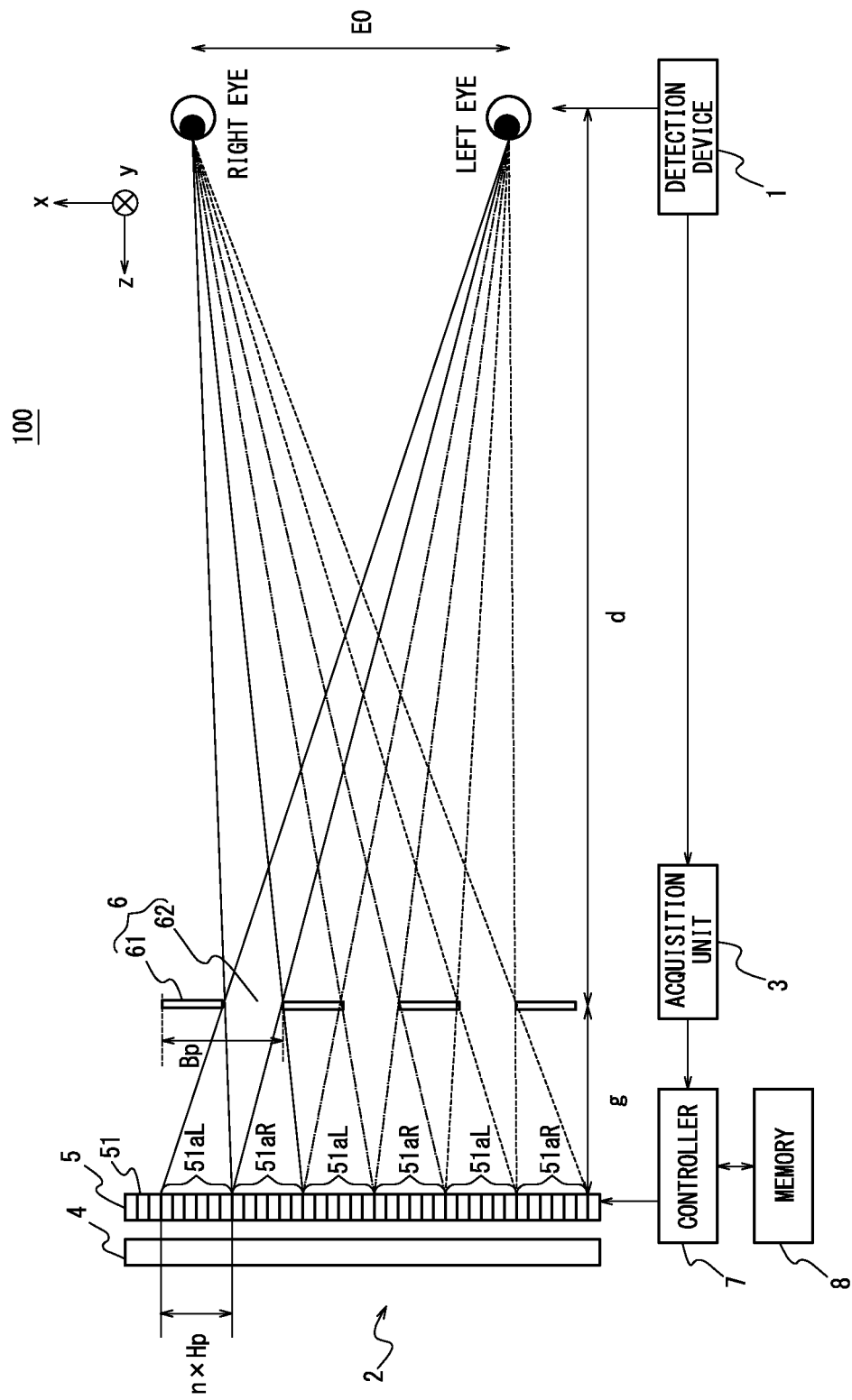
FIG. 1 is a view showing a three-dimensional display system according to an embodiment, as viewed in a vertical direction.

As shown in FIG. 1, a three-dimensional display system 100 according to an embodiment of the disclosure includes a detection device 1 and a three-dimensional display device 2.

The detection device 1 is configured to detect the positions of user's eyes, namely the left eye (first eye) and the right eye (second eye), and provide output of the detected result to the three-dimensional display device 2. For example, the detection device 1 may be equipped with a camera. The detection device 1 may be configured to photograph user's face with the camera. The detection device 1 may be configured to detect the positions of the left eye and the right eye from a photographed image including an image of the face of a camera user. The detection device 1 may be configured to detect the positions of the left eye and the right eye represented in three-dimensional space coordinates from the photographed image taken by one camera. The detection device 1 may be configured to detect the positions of the left eye and the right eye represented in three-dimensional space coordinates from photographed images taken by two or more cameras.

The detection device 1 may be configured to be connected with a camera provided outside the device instead of being provided with a camera. The detection device 1 may be provided with an input terminal for inputting a signal from the camera outside the device. The camera outside the device may be configured to be directly connected with the input terminal. The camera outside the device may be configured to be indirectly connected with the input terminal via a shared network. In the camera-free detection device 1, the camera may be provided with an input terminal for inputting a video signal. The camera-free detection device 1 may be configured to detect the positions of the left eye and the right eye in response to the video signal inputted to the input terminal.

For example, the detection device 1 may be provided with a sensor. The sensor may be an ultrasound sensor or an optical sensor, for example. The detection device 1 may be configured to detect the position of user's head with the sensor, and thereafter detect the positions of the left eye and the right eye based on the position of the head. The detection device 1 may be configured to detect the positions of the left eye and the right eye represented in three-dimensional space coordinates with one sensor, or two or more sensors.

The three-dimensional display system 100 may not include the detection device 1. In the case where the three-dimensional display system 100 is free of the detection device 1, the three-dimensional display device 2 may be provided with an input terminal for the input of a signal from a detection device disposed outside the device. The detection device outside the device may be configured to be connected with the input terminal. The detection device outside the device may be configured to use an electric signal and an optical signal as a transmission signal for the input terminal. The detection device outside the device may be configured to be indirectly connected with the input terminal via a shared network. The three-dimensional display device 2 may be configured to receive the input of positional coordinates indicative of the positions of the left eye and the right eye acquired by the detection device outside the device.

The three-dimensional display device 2 includes an acquisition unit 3, an irradiator 4, a display panel 5, a parallax barrier 6 provided as an optical element, a controller (control controller) 7, and a memory 8.

The acquisition unit 3 acquires the positions of the left eye and the right eye detected by the detection device 1.

The irradiator 4 may be configured to planarly irradiate the display panel 5. The irradiator 4 may include a light source, a light guide plate, a diffuser plate, a diffuser sheet, etc. The irradiator 4 is configured to emit irradiation light via the light source, and achieve uniformity of the irradiation light in the planar direction of the display panel 5 via the light guide plate, the diffuser plate, the diffuser sheet, etc. The irradiator 4 may be configured to emit uniform light toward the display panel 5.

Figure 2:
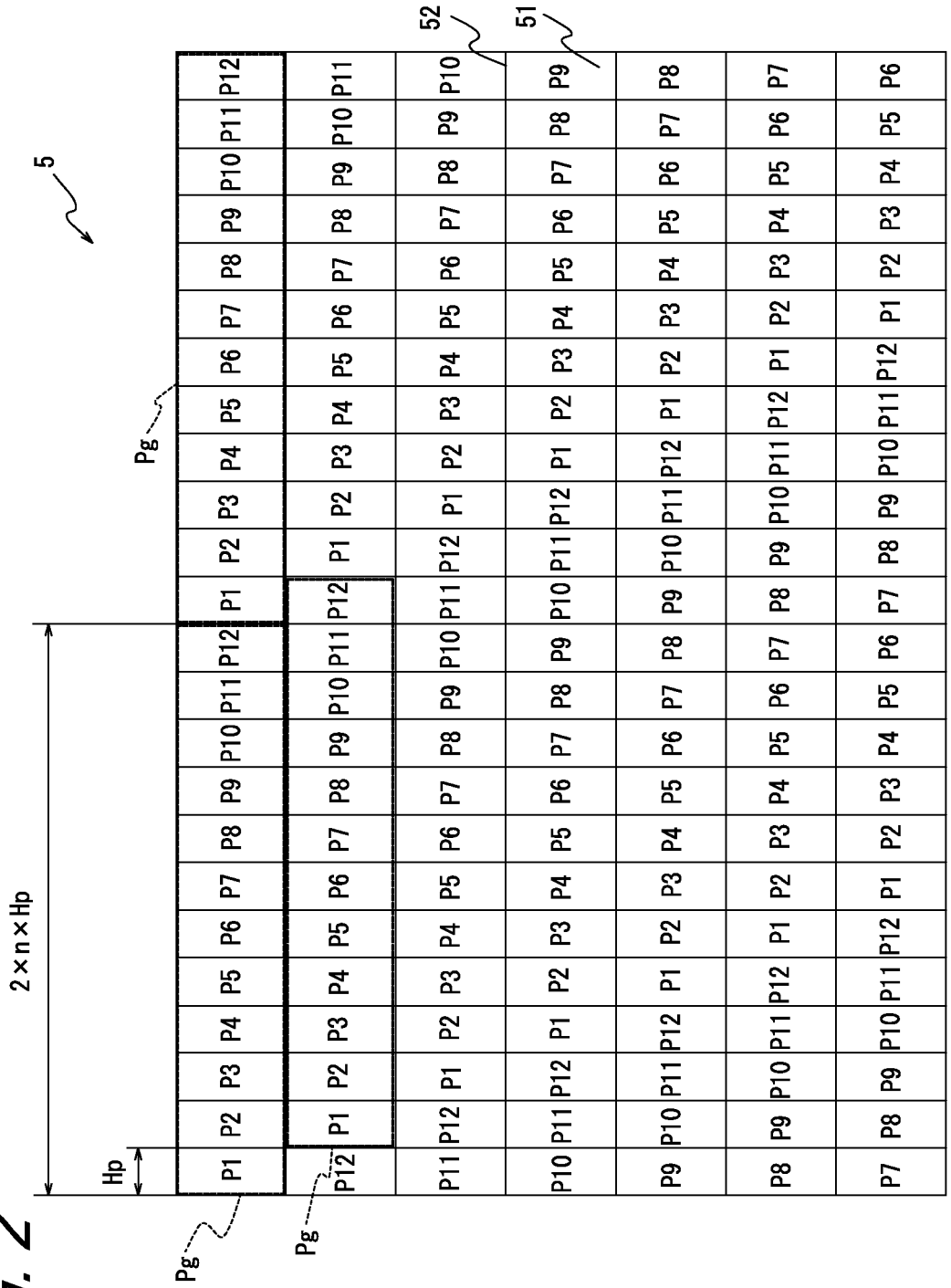
FIG. 2 is a view of a display panel shown in FIG. 1, as viewed in a depth-wise direction.

For example, a display panel such as a translucent LCD panel may be adopted for use as the display panel 5. As shown in FIG. 2, the display panel 5 includes a planar active area 51 including a plurality of segment regions thereon. The active area 51 can be operated to display an image mixture. The image mixture includes a left eye image (first image) and a right eye image (second image), which exhibits parallax with respect to the left eye image. Moreover, the image mixture includes a third image which will hereafter be described. The segment regions are obtained by partitioning the active area in a first direction and in a second direction perpendicular to the first direction via a black matrix 52 in grid form. A direction perpendicular to the first direction and the second direction will be called "third direction". The first direction may be called "horizontal direction". The second direction may be called "vertical direction". The third direction may be called "depth-wise direction". However, the definitions of the first direction, the second direction, and the third direction are not limited to this. In the drawings, the first direction is designated as an x-axis direction; the second direction is designated as a y-axis direction; and the third direction is designated as a z-axis direction.

Each segment region is assigned with a single subpixel. Thus, the active area 51 includes a matrix with horizontal and vertical rows of a plurality of subpixels arranged in grid form.

Each subpixel is associated with corresponding one of different colors, namely R (Red), G (Green), and B (Blue). A set of three subpixels corresponding to R, G, and B, respectively, may constitute one pixel. One pixel may be called "one picture element". For example, the horizontal direction is a direction in which a plurality of subpixels constituting one pixel are aligned. For example, the vertical direction is a direction in which subpixels associated with one and the same color are aligned. The display panel 5 is not limited to a translucent LCD panel and may thus be of a display panel of other type such as an organic EL display panel. In the case where a self-luminous display panel is used for the display panel 5, the three-dimensional display device 2 may not include the irradiator 4.

The plurality of subpixels arranged in the active area 51 as described above constitute a subpixel group Pg. The subpixel group Pg is arranged repetitively in the horizontal direction. In the vertical direction, the subpixel group Pg is arranged repetitively in a manner such that vertically arranged subpixel groups are offset in the horizontal direction with respect to one another by a distance corresponding to one subpixel. The subpixel group Pg includes subpixels arranged in a predetermined matrix. More specifically, the subpixel group Pg includes (2×n×b) subpixels P1 to P(2×n×b) consecutively arranged in the form of a b (vertical) by 2×n (horizontal) subpixel matrix. In the example shown in FIG. 2, n equals 6, and b equals 1. That is, the active area 51 includes the subpixel groups Pg each including 12 subpixels P1 to P12 consecutively arranged in the form of a 1 (vertical) by 12 (horizontal) subpixel matrix. In the example shown in FIG. 2, some of the subpixel groups Pg are marked with a reference character.

The subpixel group Pg is used as a minimum unit for image display control that is carried out by the controller 7 as will hereafter be described. The subpixels P1 to P(2×n×b) having identification information common to all the subpixel groups Pg are controlled simultaneously by the controller 7. For example, for switching of an image to be displayed via the subpixel P1 from a left eye image to a right eye image, the controller 7 effects concurrent switching of all images to be displayed via the subpixels P1 of the subpixel groups Pg from the left eye image to the right eye image.

As shown in FIG. 1, the parallax barrier 6 is configured to be defined by a plane along the active area 51 and be spaced by a predetermined distance (gap) away from the active area 51. The parallax barrier 6 may be configured to be located on a side of the display panel 5 which is opposite to the irradiator 4. The parallax barrier 6 may be configured to be located on a side of the display panel 5 which is close to the irradiator 4.

Figure 3:
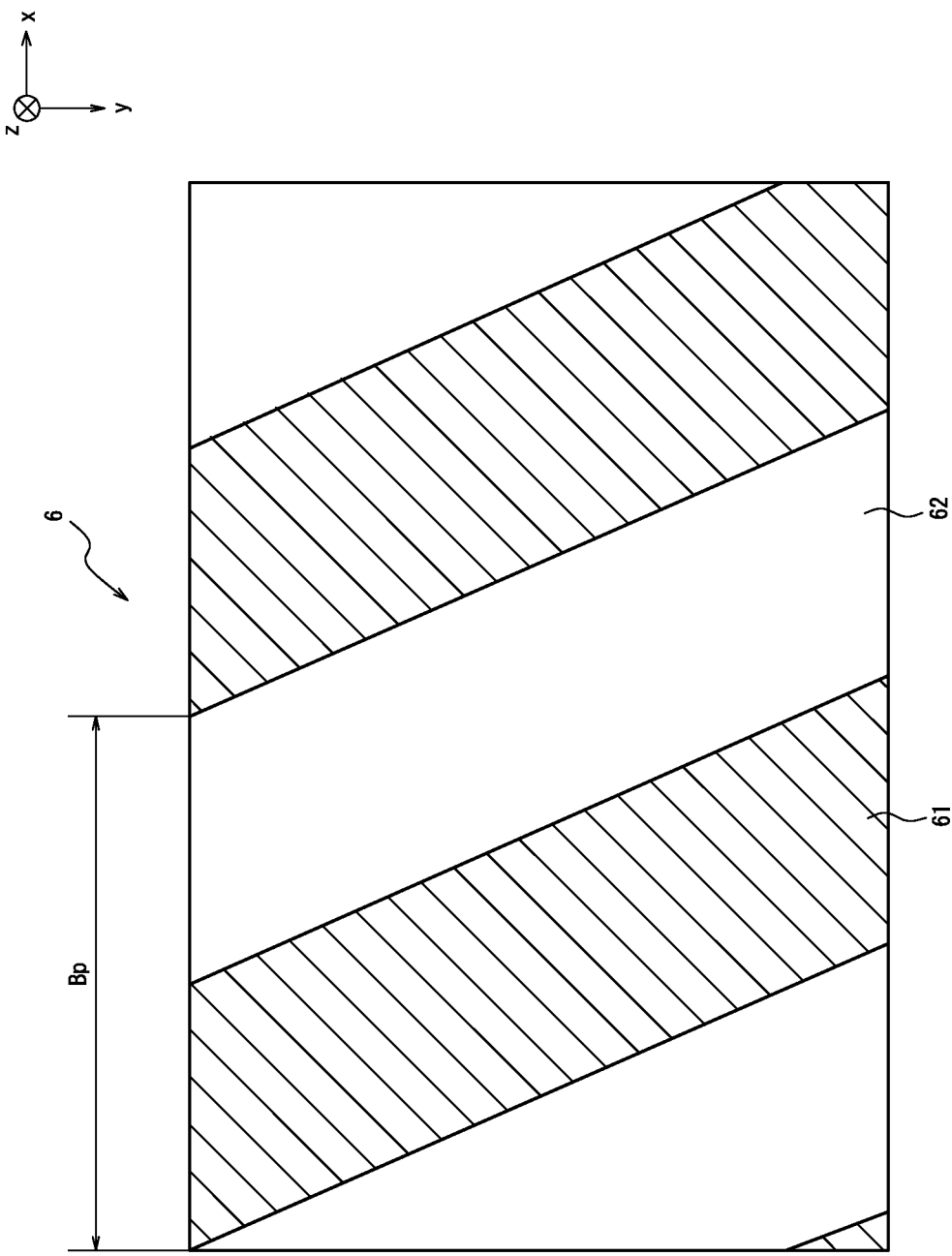
FIG. 3 is a view of a parallax barrier shown in FIG. 1, as viewed in the depth-wise direction.

As shown in FIG. 3, the parallax barrier 6, which includes a plurality of light transmitting regions 62 each in the form of a strip-shaped region extending in a predetermined direction within the plane, is configured to define a light beam direction of light, which is a propagation direction of image light emitted from the subpixel, on a light transmitting region-by-light transmitting region basis. The predetermined direction forms a predetermined other-than-zero angle with the vertical direction. As shown in FIG. 1, the definition of image light emitted from the subpixels arranged in the active area 51 by the parallax barrier 6 permits delimitation of regions on the active area 51 which are visually recognized by user's eyes. In what follows, a region within the active area 51 which emits image light that travels to the position of user's eyes will be called "visible region 51a". That is, a region within the active area 51 which emits image light that travels to the position of user's left eye will be called "left eye visible region 51aL" (first visible region), and a region within the active area 51 which emits image light that travels to the position of user's right eye will be called "right eye visible region 51aR" (second visible region).

More specifically, as shown in FIG. 3, the parallax barrier 6 includes a plurality of dimming faces 61 for dimming image light. The plurality of dimming faces 61 are configured to delimit the light transmitting regions 62, each located between the dimming faces 61 arranged adjacent each other. The light transmitting region 62 is higher in light transmittance than the dimming face 61, expressed differently, the dimming face 61 is lower in light transmittance than the light transmitting region 62.

The light transmitting region 62 is a portion which transmits light entering the parallax barrier 6. The light transmitting region 62 may enable light to pass therethrough at a transmittance which is greater than or equal to a first predetermined value. For example, the first predetermined value is set at a value of approximately 100%, or a value below 100%. The first predetermined value need only be a value that ensures satisfactory viewing of image light emitted from the active area 51, and may thus be set at a value which is less than or equal to 100%, for example, 80% or 50%. The dimming face 61 is a portion which blocks light entering the parallax barrier 6 and hardly transmits the light. In other words, the dimming face 61 restrains user's eyes from having access to an image displayed on the active area 51 of the display panel 5. The dimming face 61 may block light at a transmittance which is less than or equal to a second predetermined value. For example, the second predetermined value is set at a value of approximately 0%, or a value above or close to 0%, for example, 0.5%, 1%, or 3%. The first predetermined value may be several times as great as the second predetermined value, or, for example, may be more than ten times the second predetermined value.

The light transmitting regions 62 and the dimming faces 61, each extending in a predetermined direction over the active area 51, are arranged in alternate order in a direction perpendicular to the predetermined direction. The light transmitting region 62 is configured to define a light beam direction of image light emitted from the corresponding subpixel.

As shown in FIG. 1, a barrier pitch Bp, which is the pitch of horizontal arrangement of the light transmitting regions 62, and a gap g between the active area 51 and the parallax barrier 6 are determined so that the following expressions (1) and (2) using an optimal viewing distance d and a standard distance E0 hold.

$$E0:d=(n \times Hp):g \qquad (1)$$

$$d:Bp=(d+g):(2 \times n \times Hp) \qquad (2)$$

The optimal viewing distance d refers to a distance between each of user's right and left eyes and the parallax barrier 6, which is such that the horizontal length of the visible region 51a equates to the size of n subpixels. A direction of a straight line passing through the right eye and the left eye (the eye arrangement direction) coincides with the horizontal direction. The standard distance E0 refers to an average inter-eye distance E of users. For example, the standard distance E0 may be set at values ranging from 61.1 mm to 64.4 mm obtained by calculation in the study by National Institute of Advanced Industrial Science and Technology. Hp represents the horizontal length of the subpixel as shown in FIG. 2.

The parallax barrier 6 may be formed of a film or a sheet member having a transmittance which is less than the second predetermined value. In this case, the dimming face 61 is constituted by the film or the sheet member. The light transmitting region 62 is constituted by an opening formed in the film or the sheet member. The film may be formed of resin or other material. The sheet member may be formed of resin or metal, or other material. The parallax barrier 6 is not limited to the film and the sheet member, and may thus be formed of other member of different type. The parallax barrier 6 may include a base material which exhibits dimming properties on its own, or a base material containing an adjunct having dimming properties.

The parallax barrier 6 may be constructed of a liquid crystal shutter. The liquid crystal shutter may be configured to control light transmittance according to an applied voltage. The liquid crystal shutter, which includes a plurality of pixels, may be configured to control light transmittance in each pixel. In the liquid crystal shutter, a region of high light transmittance or a region of low light transmittance may be formed in any given configuration. In the case where the parallax barrier 6 is constructed of a liquid crystal shutter, the light transmitting region 62 may be made as a region having a transmittance which is greater than or equal to the first predetermined value. Moreover, in the case where the parallax barrier 6 is constructed of a liquid crystal shutter, the dimming face 61 may be made as a region having a transmittance which is less than or equal to the second predetermined value.

Thus constructed, the parallax barrier 6 enables image light emitted from some subpixels in the active area 51 to pass through the light transmitting region 62 and travel to user's right eye. Moreover, the parallax barrier 6 enables image light emitted from some other subpixels to pass through the light transmitting region 62 and travel to user's left eye. Propagation of image light to each of user's left and right eyes allows an image visually recognized by user's eyes to be provided. This will now be described in detail with reference to FIGS. 4 and 5.

Figure 4:
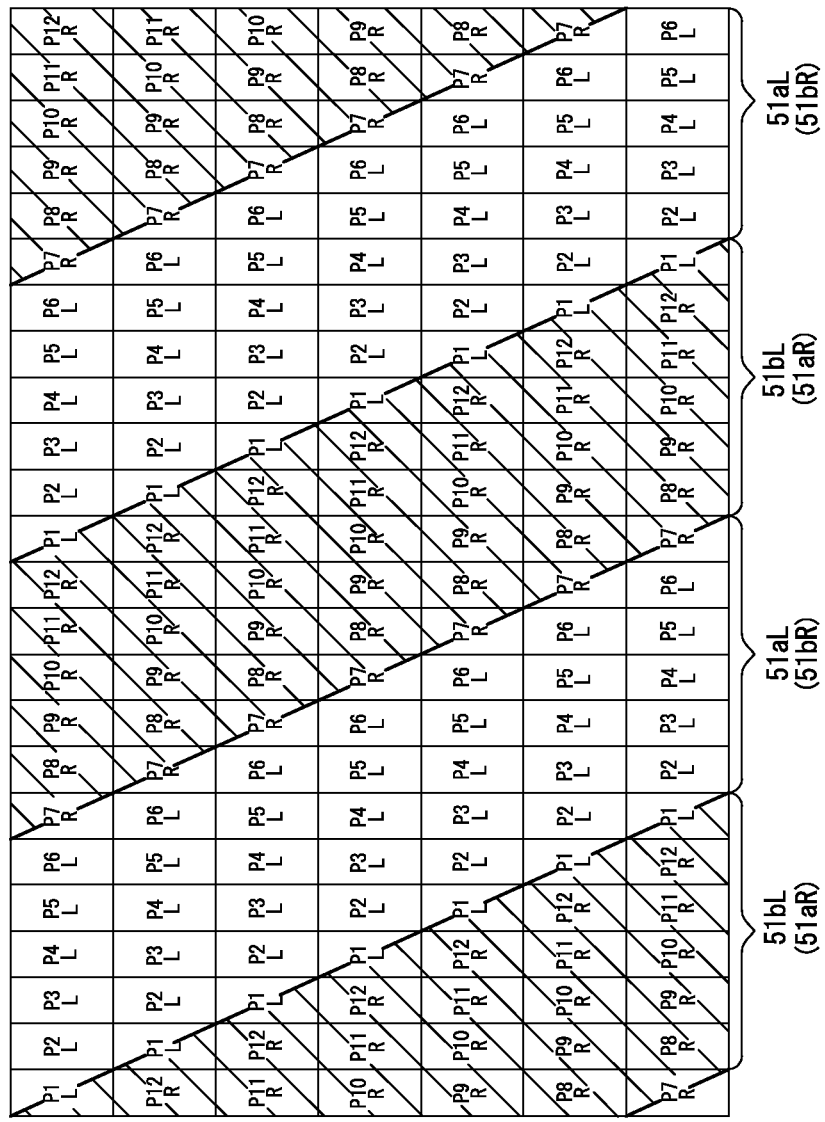
FIG. 4 is a view for illustrating a left eye visible region on the display panel shown in FIG. 1.

As described above, the left eye visible region 51aL shown in FIG. 4 is a part on the active area 51 which is visually recognized by user's left eye upon arrival of image light which has passed through the light transmitting region 62 of the parallax barrier 6 at user's left eye. On the other hand, a left eye non-visible region 51bL is a region which cannot be visually recognized by user's left eye due to image light being blocked by the dimming face 61 of the parallax barrier 6. The left eye visible region 51aL includes one-half of the subpixel P1, the whole of the subpixels P2 to P6, and one-half of the subpixel P7.

Figure 5:
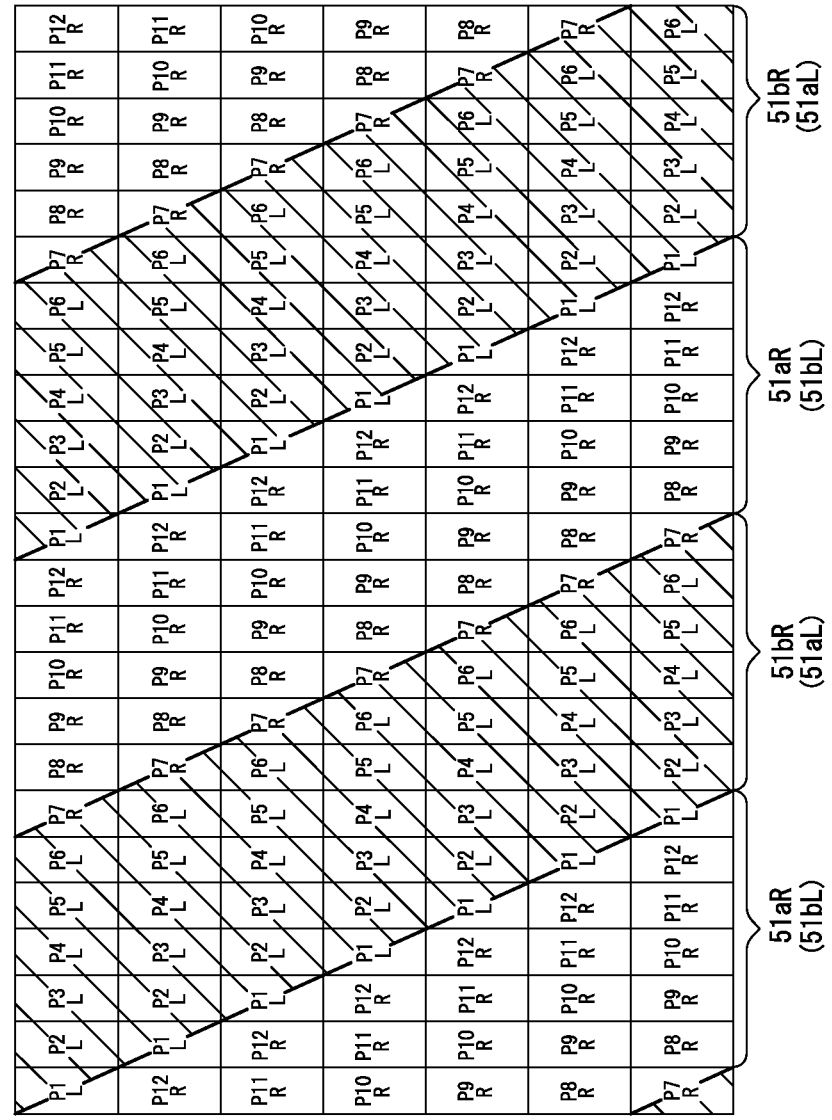
FIG. 5 is a view for illustrating a right eye visible region on the display panel shown in FIG. 1.

The right eye visible region 51aR shown in FIG. 5 is a part on the active area 51 which is visually recognized by user's right eye upon arrival of image light from some other subpixels, which has passed through the light transmitting region 62 of the parallax barrier 6, at user's right eye. On the other hand, a right eye non-visible region 51bR is a region which cannot be visually recognized by user's right eye due to image light being blocked by the dimming face 61 of the parallax barrier 6. The right eye visible region 51aR includes one-half of the subpixel P7, the whole of the subpixels P8 to P12, and one-half of the subpixel P1.

When a left eye image is displayed via the subpixels P1 to P6 and a right eye image is displayed via the subpixels P7 to P12, the left eye and the right eye visually recognize the corresponding images. The right eye image and the left eye image are parallax images that exhibit parallax with respect to each other. More specifically, the left eye visually recognizes one-half of the left eye image displayed via the subpixel P1, the whole of the left eye image displayed via the subpixels P2 to P6, and one-half of the right eye image displayed via the subpixel P7, and, the right eye visually recognizes one-half of the right eye image displayed via the subpixel P7, the whole of the right eye image displayed via the subpixels P8 to P12, and one-half of the left eye image displayed via the subpixel P1. In FIGS. 4 and 5, the subpixels for left eye image display are each marked with a reference character "L", and the subpixels for right eye image display are each marked with a reference character "R".

In this condition, the area of the left eye image which is visually recognized by user's left eye is maximized, whereas the area of the right eye image is minimized. Moreover, the area of the right eye image which is visually recognized by user's right eye is maximized, whereas the area of the left eye image is minimized. This allows the user to view a three-dimensional image with minimum crosstalk.

In the three-dimensional display device 2 thereby constructed, when the left eye image and the right eye image, which exhibit parallax with respect to each other, are displayed via the subpixel included in the left eye visible region 51aL and the subpixel included in the right eye visible region 51aR, respectively, a user whose inter-eye distance E is the standard distance E0 is able to view a three-dimensional image properly. Although, in the above-described construction, the left eye image is displayed via a subpixel of which half or more is visually recognized by the left eye, and the right eye image is displayed via a subpixel of which half or more is visually recognized by the right eye, this does not intend to suggest design limitation. Depending on the configurations of the active area 51, the parallax barrier 6, etc., determination of subpixels for display of the left eye image and the right eye image may be made freely yet suitably on the basis of the left eye visible region 51aL and the right eye visible region 51aR in the interest of minimization of crosstalk. For example, in this construction, according to the opening ratio of the parallax barrier 6, etc., the left eye image may be displayed via a subpixel which is visually recognized by the left eye at a predetermined rate or more, and the right eye image may be displayed via a subpixel which is visually recognized by the right eye at a predetermined rate or more.

The controller 7 may be configured to make connection with each of the components constituting the three-dimensional display system 100 for control of the constituent components. The constituent components that are controlled by the controller 7 include the detection device 1 and the display panel 5. For example, the controller 7 is built as a processor. The controller 7 may include one processor or two or more processors. The processors may include a general-purpose processor for performing a predetermined function by loading of a predetermined program, and a special-purpose processor designed specifically for a predetermined processing operation. The special-purpose processor may include an ASIC (Application-Specific Integrated Circuit). The processor may include a PLD (Programmable Logic Device). The PLD may include a FPGA (Field-Programmable Gate Array). The controller 7 may be based on any one of SoC (System-on-a-Chip) using a single processor or a plurality of processors that operate in cooperation, and SiP (System In a Package). The controller 7 may include a memory unit, and store various information, or programs for operation of the constituent components of the three-dimensional display system 100, etc. in the memory unit. For example, the memory unit may be constructed of semiconductor memory. The memory unit may serve as working memory for the controller 7.

For example, the memory 8 is constructed of a given memory device such as RAM (Random Access Memory) and ROM (Read Only Memory). The memory 8 stores one of or two or more of a first table, a second table, and a third table that will hereafter be described in detail. The memory 8 is configured to store one of or two or more of a fourth table, a fifth table, and a sixth table that will hereafter be described in detail.

<<In the Case where an Inter-Eye Distance is not a Standard Distance>>

Figure 6:
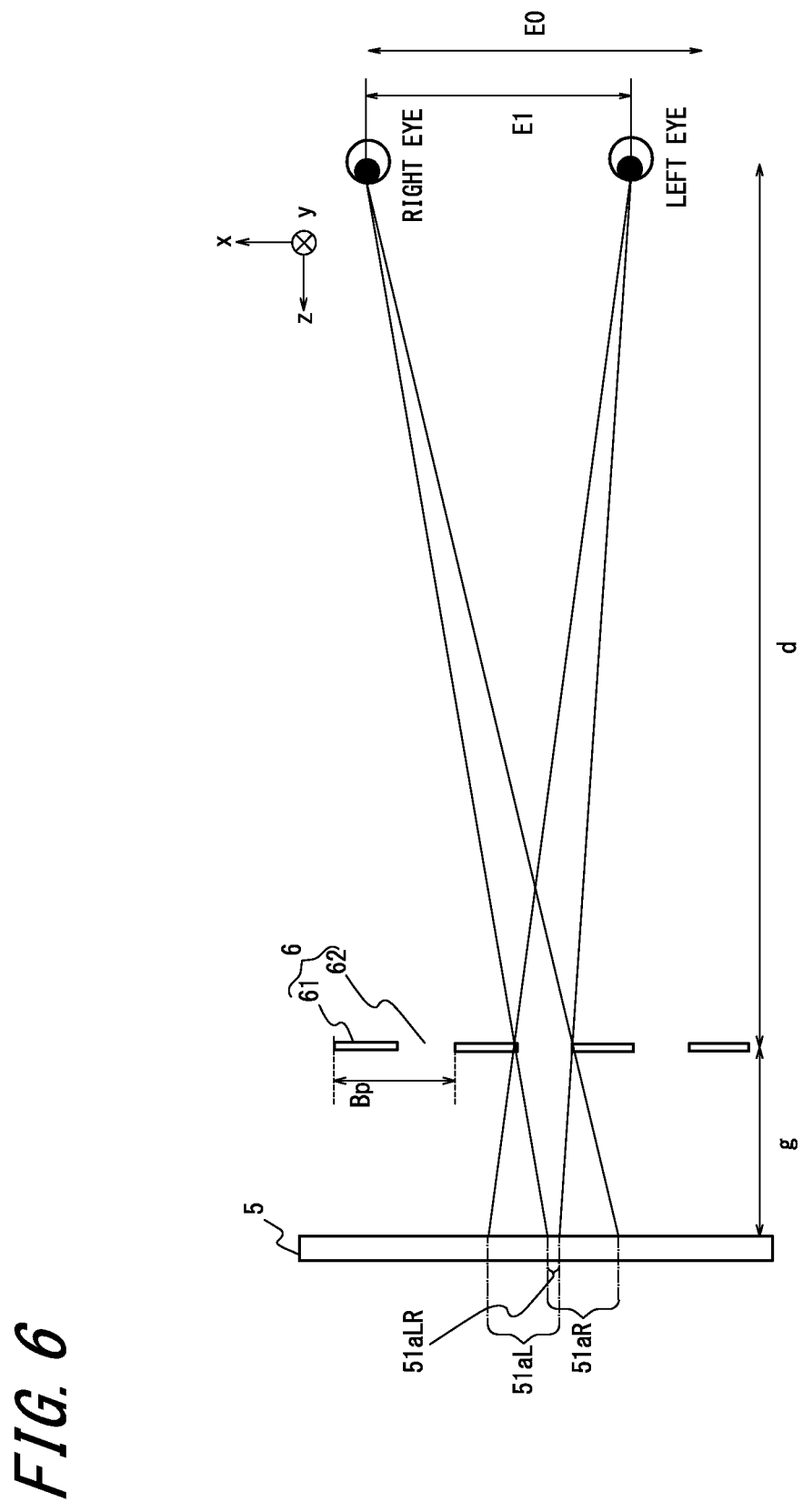
FIG. 6 is a view for illustrating a binocularly visible region in the three-dimensional display system shown in FIG. 1.

In the case where user's inter-eye distance E is defined as an inter-eye distance E1 which differs from the standard distance E0, as shown in FIG. 6, there may exist a binocularly visible region 51aLR where part of the left eye visible region 51aL and part of the right eye visible region 51aR are overlapped. Thus, there may exist a subpixel which is a left subpixel (first subpixel) determined to be intended to display the left eye image on the basis of the left eye visible region 51aL and also is a right subpixel (second subpixel) determined to be intended to display the right eye image on the basis of the right eye visible region 51aR. For example, the left subpixel is a subpixel which is included at a predetermined rate (half, for example) or more in the left eye visible region 51aL. For example, the right subpixel is a subpixel which is included at a predetermined rate or more in the right eye visible region 51aR.

In this construction, when the right eye image is displayed via the subpixel which is the left subpixel and also is the right subpixel, the area of the right eye image visually recognized by the left eye is increased. Moreover, when the left eye image is displayed via the subpixel which is the left subpixel and also is the right subpixel, the area of the left eye image visually recognized by the right eye is increased. Consequently, any of display of the left eye image and display of the right eye image on the overlapping subpixels may cause increased crosstalk. In this regard, the controller 7 is configured to carry out control so as to reduce crosstalk generated when the user having the inter-eye distance E1 views the three-dimensional display device 2 designed according to the standard distance E0. The following details the controller 7.

<Determination of Third Subpixel>

The controller 7 is configured to determine a third subpixel on the basis of the positions of user's eyes in the horizontal direction. The third subpixel is a subpixel which is the left subpixel which is included at a predetermined rate proportion or more in the left eye visible region 51aL and also is the right subpixel which is included at a predetermined rate or more in the right eye visible region 51aR. The following describes examples of third-subpixel determination procedure.

First Example

The controller 7 may be configured to determine the left eye visible region 51aL by performing computation on the position of the left eye, the gap g, the optimal viewing distance d, and the location of the light transmitting region 62 when the detection device 1 detects the position of the left eye.

Figure 7:
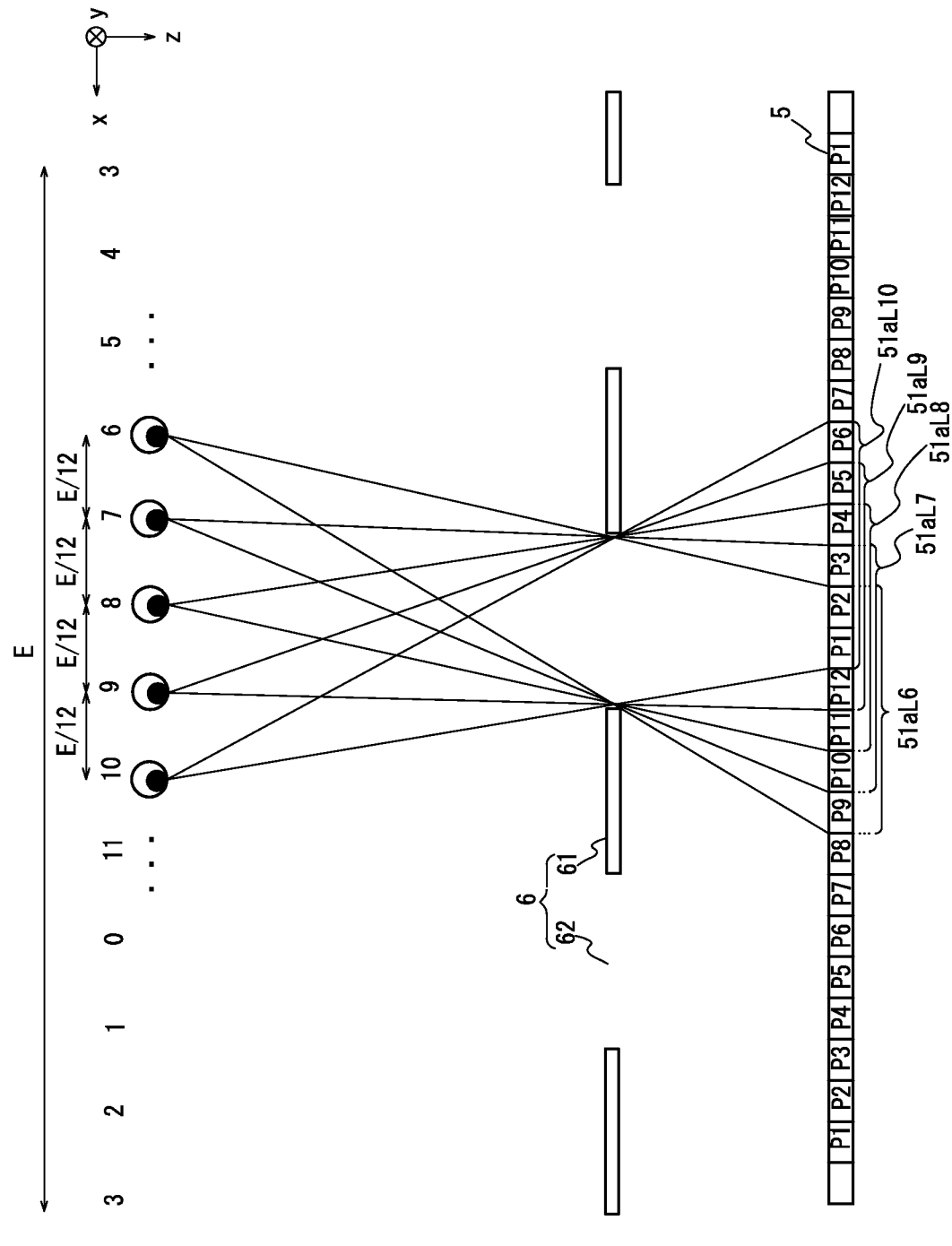
FIG. 7 is a view for illustrating details of the left eye visible region on the display panel based on the position of the left eye.

For example, as shown in FIG. 7, when the left eye lies at a position "6", the controller 7 is configured to determine that the left eye visible region 51aL is a left eye visible region 51aL6 by performing computation on the gap g, the optimal viewing distance d, and the location of the light transmitting region 62. The controller 7 is configured to determine a left subpixel which is included at a predetermined rate or more in the left eye visible region 51aL6. In the example shown in FIG. 7, the controller 7 may be configured to determine that the subpixels P9 to P12, P1, and P2 in the left eye visible region 51aL are the left subpixels. The controller 7 may be configured to determine the left subpixel on the basis of the left eye visible region 51aL in a given manner permitting maximization of the area of the left eye image visually recognized by the left eye.

When the left eye lies at a position "7", the controller 7 is configured to determine that the left eye visible region 51aL is a left eye visible region 51aL7 by performing computation on the gap g, the optimal viewing distance d, and the location of the light transmitting region 62. The controller 7 determines a left subpixel which is included at a predetermined rate or more in the left eye visible region 51aL7. In the example shown in FIG. 7, the controller 7 may be configured to determine that the subpixels P10 to P12 and P1 to P3 are the left subpixels.

As described above, the barrier pitch Bp, the gap g, and the optimal viewing distance d are preset so that the left eye visible region 51aL and the right eye visible region 51aR are not overlapped in a case where the inter-eye distance E is the standard distance E0. According to the related art, for example, the controller 7 acquired only the position of the left eye, and determined the left eye visible region 51aL in accordance with the position of the left eye, and also determined that a region other than the left eye visible region 51aL is the right eye visible region 51aR. On the other hand, in this embodiment, the controller 7 is configured to determine the right eye visible region 51aR after performing computation on the position of user's right eye detected by the detection device 1, the location of the barrier opening area, the gap g, and the optimal viewing distance d. The controller 7 may be configured to determine the right subpixel intended to display the right eye image on the basis of the right eye visible region 51aR. The method by which the controller 7 determines the right subpixel on the basis of the right eye visible region 51aR is identical with a method by which the controller 7 determines the left subpixel on the basis of the left eye visible region 51aL.

The controller 7 is configured to determine the third subpixel which is the left subpixel and also is the right subpixel when the left subpixel and the right subpixel are determined.

Second Example

Figure 8:
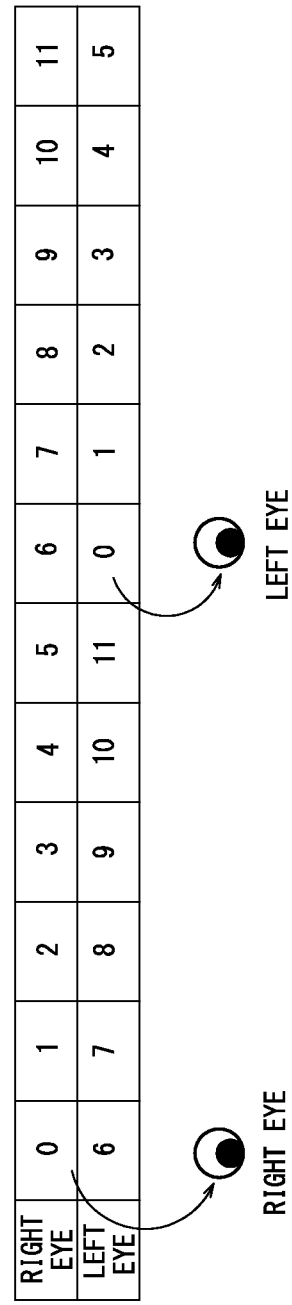
FIG. 8 is a view for illustrating information for identifying the position of the left eye and the position of the right eye.

The controller 7 may be configured to determine the third subpixel with use of the first table prestored in the memory 8. In the description of this example, as shown in FIG. 8, the position of the right eye and the position of the left eye in the horizontal direction are each identified by information 0 to 11. For the case where the inter-eye distance is the standard distance, the information for identification of the position of the right eye is assigned in the same manner as that for identification of the position of the left eye.

As shown in FIG. 9, the first table stores data on the corresponding relation between the position of the left eye and the position of the right eye, under conditions where the inter-eye distance E is the standard distance E0, and each of the left subpixel which is included at a predetermined rate or more in the left eye visible region 51aL and the right subpixel which is included at a predetermined rate or more in the right eye visible region 51aR. In the example shown in FIG. 9, pieces of information 0 to 11 for identification of eye position are shown as arranged in a column, and pieces of information P1 to P12 for identification of subpixels are shown as arranged in a row. The first table shows whether each subpixel in relation to a certain eye position is the left subpixel or the right subpixel. The character "LEFT" and the character "RIGHT" in FIG. 9 indicate the left subpixel and the right subpixel, respectively. As described with reference to FIG. 8, when the inter-eye distance is the standard distance, in the case where the left eye lies at a position "0", the right eye lies at a position "0". For this case, FIG. 9 indicates that the subpixels P1 to P6 are the left subpixels, and the subpixels P7 to P12 are the right subpixels. Moreover, in the case where the left eye lies at a position "1", the right eye lies at a position "1". For this case, FIG. 9 indicates that the subpixels P2 to P7 are the left subpixels, and the subpixels P8 to P12 are the right subpixels.

In the case where the inter-eye distance E is not the standard distance E0, when an image is displayed based on the position of the right eye according to the first table shown in FIG. 9, the right eye image is displayed via the subpixel intended to display the left eye image for the left eye. More specifically, when the left eye lies at a position "11" and the right eye lies at a position "0", in accordance with the position "0" of the right eye, the controller 7 is configured to drive the subpixels P1 to P6 to display the left eye image and drive the subpixels P7 to P12 to display the right eye image. In this case, as shown in the first table, with respect to the position "11" of the left eye, the subpixels P1 to P5 and P12 are to be intended to display the left eye image. Thus, when an image is displayed based on the position of the right eye via each subpixel, the right eye image displayed via the subpixel P12 becomes visible. This increases the area of the right eye image visually recognized by the left eye, which results in increased crosstalk.

In this regard, the controller 7 is configured to determine that a subpixel, which is the right subpixel which is included at a predetermined rate or more in the right eye visible region 51aR based on the position of the right eye and also is the left subpixel which is included at a predetermined rate or more in the left eye visible region 51aL based on the position of the left eye, is the third subpixel.

For example, when the detection device 1 detects that the right eye lies at a position "0", in accordance with the position "0" of the right eye, the controller 7 is configured to determine that the subpixels P7 to P12 are the right subpixels by using the first table. At this time, when the detection device 1 detects that the left eye lies at a position "11", in accordance with the position of the left eye, the controller 7 is configured to determine that the subpixels P1 to P5 and P12 are the left subpixels by using the first table. Thus, the controller 7 determines that the third subpixel corresponds to the subpixel P12.

Third Example

The controller 7 may be configured to determine the third subpixel with use of the second table, prestored in the memory 8, for indicating the correspondence between the third subpixel, and the position of the right eye and the position of the left eye.

As described above, the left eye visible region 51aL and the right eye visible region 51aR may be determined in accordance with the positions of the left eye and the right eye. The left subpixel and the right subpixel may be determined on the basis of the left eye visible region 51aL and the right eye visible region 51aR, respectively. Moreover, the third subpixel may be determined on the basis of the left subpixel and the right subpixel. Thus, as shown in FIG. 10, the third subpixels may be stored in correspondence with the positions of the left eye and the right eye in the second table.

The controller 7 is configured to determine that the subpixel stored in correspondence with the positions of the left eye and the right eye in the second table is the third subpixel. In the example shown in FIG. 10, pieces of information 0 to 11 for identification of the position of the left eye are shown as arranged in a row, and pieces of information 0 to 11 for identification of the position of the right eye are shown as arranged in a column. Also stored in the table is information as to the subpixels defined as the third subpixels in association with the information for identification of the position of the left eye and the information for identification of the position of the right eye.

For example, it is assumed that the detection device 1 detects that the left eye lies at a position "11" and the right eye lies at a position "0". In this case, the controller 7 is configured to determine that the subpixel P6 shown in the second table as corresponding to the position "11" of the left eye and the position "0" of the right eye is the third subpixel.

<Determination of Fourth Subpixel>

The controller 7 is configured to determine a fourth subpixel on the basis of the positions of user's eyes. The fourth subpixel is a subpixel which is neither the left subpixel nor the right subpixel. For example, as in the above-described first and second examples, the controller 7 may be configured to determine the left subpixel and the right subpixel individually. The controller 7 may be configured to determine that a subpixel which is neither the left subpixel nor the right subpixel is the fourth subpixel.

As described above, the left eye visible region 51aL and the right eye visible region 51aR may be determined in accordance with the positions of the left eye and the right eye. The left subpixel and the right subpixel may be determined on the basis of the left eye visible region 51aL and the right eye visible region 51aR, respectively. Moreover, the fourth subpixel may be determined on the basis of the left subpixel and the right subpixel. Thus, the third table indicating the fourth subpixels may be stored in correspondence with the positions of the right eye and the left eye in the memory 8. In the construction in which the third table is stored in the memory 8, the controller 7 may be configured to determine that the subpixel stored in correspondence with the positions of the left eye and the right eye in the third table is the fourth subpixel.

<Display of Image>

Subsequently, the controller 7 drives the subpixel which is not the right subpixel but the left subpixel, to display the left eye image. The controller 7 is configured to drive the subpixel which is not the left subpixel but the right subpixel, to display the right eye image. The controller 7 is configured to drive the third subpixel to display the third image.

The controller 7 may be configured to drive the third subpixel to display, for example, a black image as the third image. For example, the black image refers to a blackish image having a predetermined brightness. The predetermined brightness may be set at a value corresponding to the luminance at the lowest gradation level or a gradation level comparable to the lowest gradation level among all the gradation levels that can be represented by subpixels. The controller 7 may be configured to drive the third subpixel to display the black image.

The controller 7 may be configured to drive the third subpixel to display one of the left eye image and the right eye image as the third image based on, for example, user's characteristics. Examples of user's characteristics include user's dominant eye. More specifically, the controller 7 may be configured to display one of the left eye image and the right eye image which corresponds to the dominant eye, on the basis of preset or externally inputted information indicating user's dominant eye. The controller 7 may be configured to display the left eye image as the third image when user's dominant eye is user's left eye, and display the right eye image as the third image when user's dominant eye is user's right eye.

The controller 7 may be configured to drive the third subpixel to display, as the third image, an average image having a brightness value equivalent to the average of the brightness values of the left eye image and the right eye image.

Figure 11:
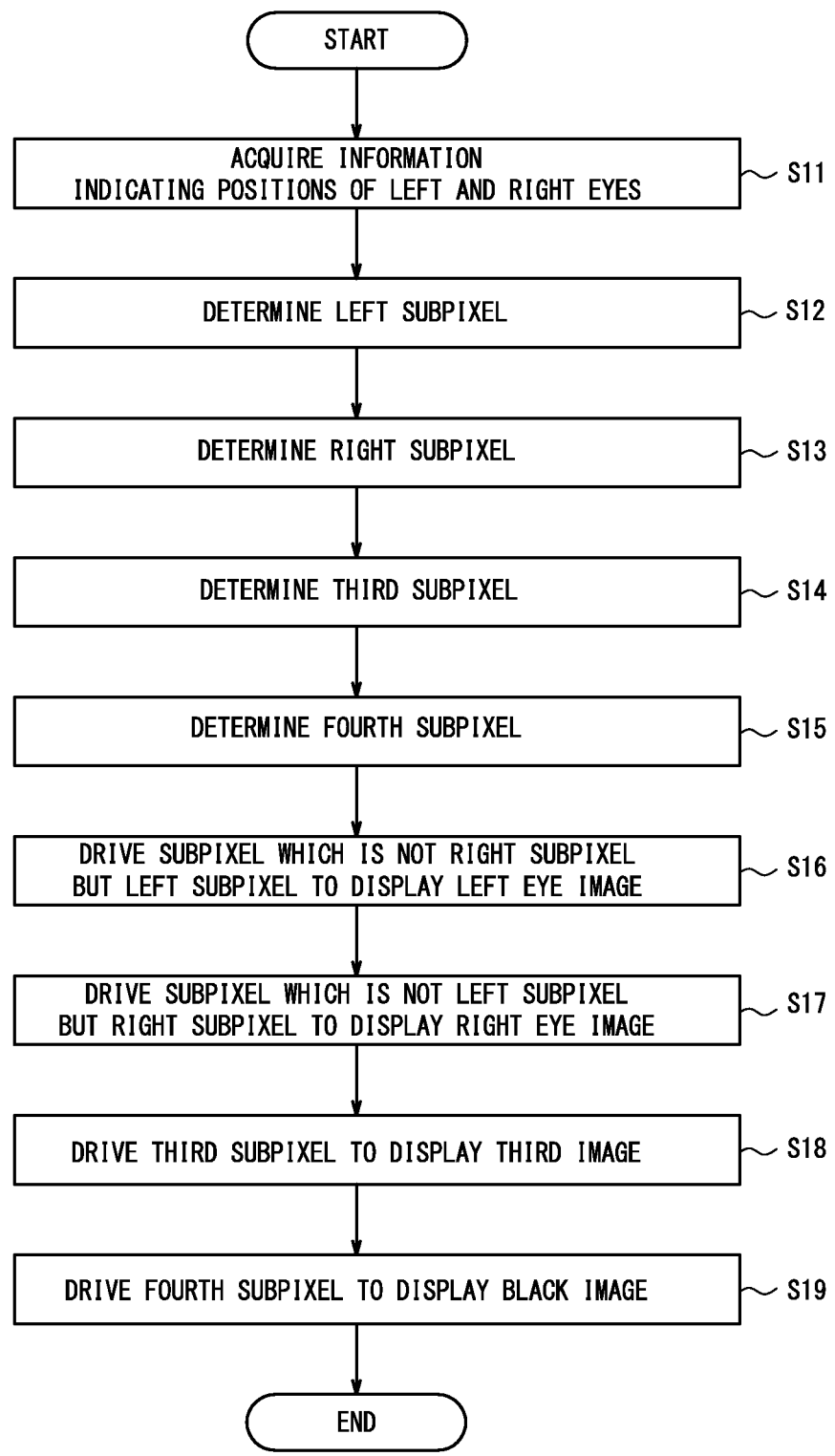
FIG. 11 is a flow chart showing an example of the flow of processing executed by a three-dimensional display device under conditions where the inter-eye distance is not the standard distance.

The following describes an example of processing procedure to be performed by the three-dimensional display device 2 when the inter-eye distance E is not the standard distance E0 with reference to FIG. 11.

The controller 7 acquires information indicating the positions of user's left eye and right eye from the detection device 1 (Step S11).

When information indicating the position of the left eye is acquired in Step S11, the controller 7 determines the left eye visible region 51aL on the basis of the position of the left eye, and then determines the left subpixel on the basis of the left eye visible region 51aL (Step S12).

When the left eye visible region 51aL is determined in Step S12, the controller 7 determines the right eye visible region 51aR on the basis of the position of the right eye indicated by the information acquired in Step S11, and then determines the right subpixel on the basis of the right eye visible region 51aR (Step S13).

When the left subpixel is determined in Step S12 and the right subpixel is determined in Step S13, the controller 7 determines the third subpixel on the basis of the left subpixel and the right subpixel (Step S14). The controller 7 may determine the third subpixel by using information indicating the positions of the right eye and the left eye acquired in Step S11.

When the third subpixel is determined in Step S14, the controller 7 determines the fourth subpixel on the basis of the left subpixel and the right subpixel (Step S15). The controller 7 may determine the fourth subpixel by using information indicating the positions of the right eye and the left eye acquired in Step S11.

When the fourth subpixel is determined in Step S15, the controller 7 drives the subpixel which is not the right subpixel but the left subpixel to display the left eye image (Step S16).

When the left eye image is displayed in Step S16, the controller 7 drives the subpixel which is not the left subpixel but the right subpixel to display the right eye image (Step S17).

When the right eye image is displayed in Step S17, the controller 7 drives the third subpixel to display the third image (Step S18).

When the third image is displayed via the third subpixel in Step S18, the controller 7 drives the fourth subpixel to display the black image (Step S19).

<<In the Case where User's Face is Inclined in the Roll Direction>>

Figure 12:
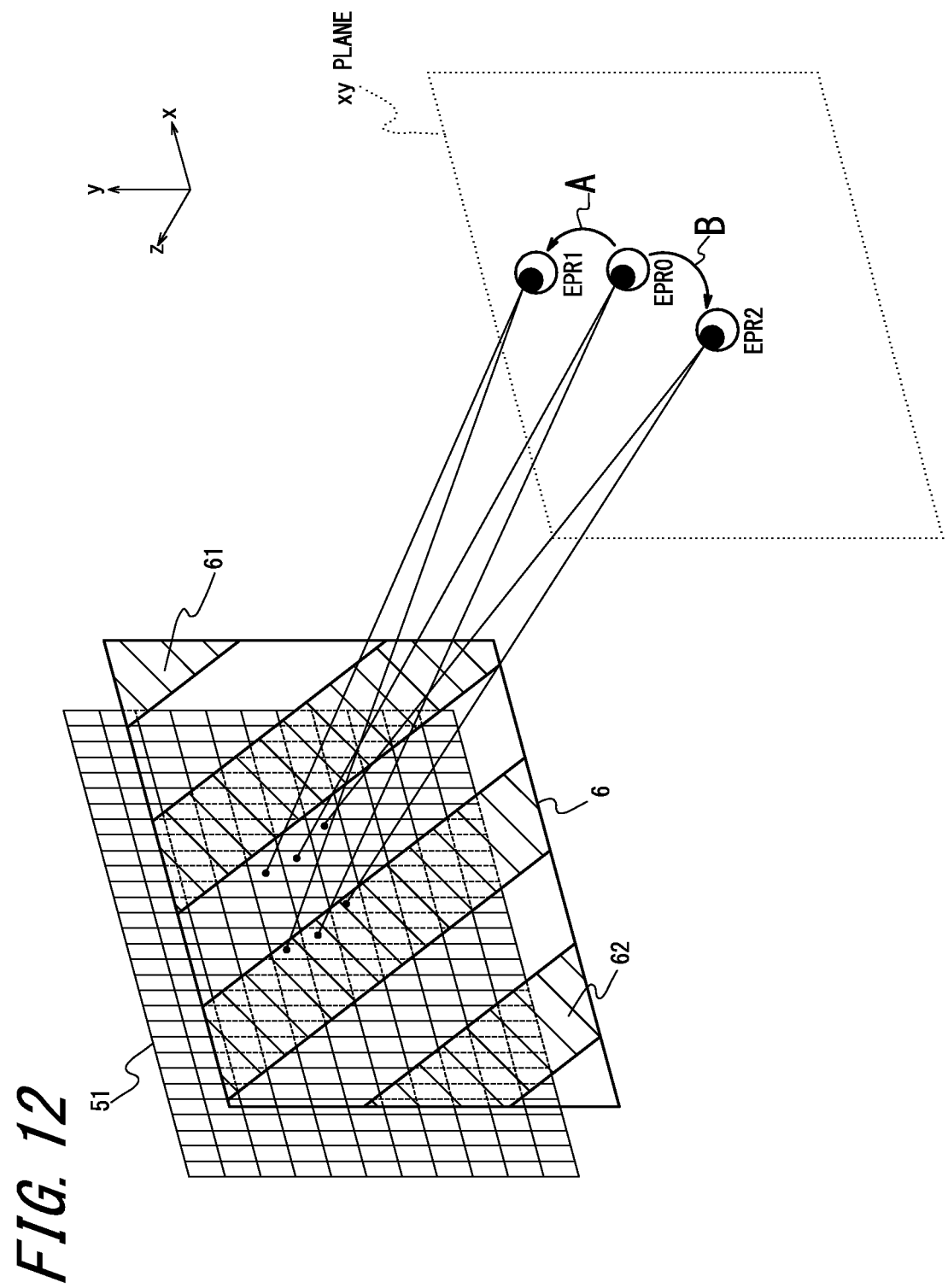
FIG. 12 is a view for illustrating display panel regions of the three-dimensional display system shown in FIG. 1 that are visually recognized by user's eyes when an eye arrangement direction is inclined in the roll direction.

As described above, the display panel 5 and the parallax barrier 6 are configured to allow a user to visually recognize a three-dimensional image properly under conditions where user's right and left eyes are spaced by the optimal viewing distance d away from the parallax barrier 6. Thus, when user's face is inclined in the roll direction, as shown in FIG. 12, user's right eye is displaced in the horizontal and vertical directions. Likewise, user's left eye is displaced in the horizontal and vertical directions from a standard position to a displaced position.

The inclination of user's face in the roll direction means that the face is inclined only within the range of a plane whose normal direction is the depth-wise direction (xy plane) without undergoing any shift in the depth-wise direction (z-axis direction). When in their standard position, user's left eye and right eye are each spaced by the optimal viewing distance d away from the parallax barrier 6, and are aligned in the horizontal direction. In the following description, the standard position of the left eye will be called "left eye standard position EPL0", and the standard position of the right eye will be called "right eye standard position EPR0". A position that the left eye assumes after undergoing displacement due to the rotation of user's face in a predetermined direction about the center of the line connecting the two eyes (the center of an inter-eye line) will be called "left eye displaced position EPL1", and a position that the right eye assumes in the same state will be called "right eye displaced position EPR1". A position that the left eye assumes after undergoing displacement due to the rotation of user's face in a direction opposite to the predetermined direction about the center of the inter-eye line will be called "left eye displaced position EPL2", and a position that the right eye assumes in the same state will be called "right eye displaced position EPR2".

As described above, when the position of the left eye is displaced in the horizontal direction, the left eye visible region 51aL varies, and, when the position of the right eye is displaced in the horizontal direction, the right eye visible region 51aR varies. The light transmitting region 62 of the parallax barrier 6 extends in a direction forming a predetermined non-zero angle with respect to the vertical direction. That is, the position of each end of the light transmitting region 62 in the horizontal direction varies according to eye position in the vertical direction. Thus, as shown in FIG. 12, vertical displacement of the right eye also causes the right eye visible region 51aR to vary. Likewise, vertical displacement of the left eye also causes the left eye visible region 51aL to vary. Hence, the right eye visible region 51aR is determined on the basis of the position of the right eye in the horizontal and vertical directions. Likewise, the left eye visible region 51aL is determined on the basis of the position of the left eye in the horizontal and vertical directions. The segment regions in the active area 51 shown in FIG. 12 are in a one-to-one correspondence with the subpixels thus far described with reference to FIG. 2.

The following details subpixels that change displayed images according to the inclination of user's face in the roll direction.

Figure 13:
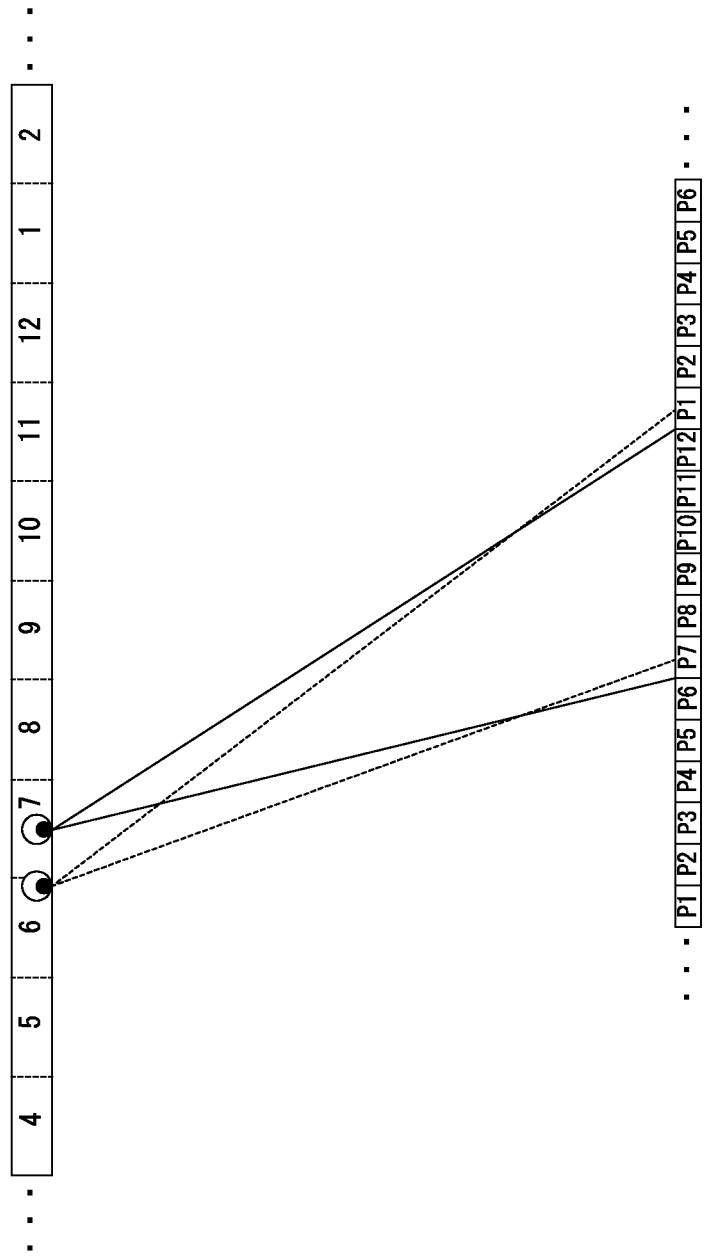
FIG. 13 is a view for illustrating a visible region as observed when the eye is displaced so as to move beyond a control boundary.

As shown in FIG. 13, the controller 7 is configured to drive at least some of the subpixels to change the displayed image when the position of the left eye moves beyond a control boundary. The control boundary refers to the boundary of control regions arranged adjacent each other in the horizontal direction. The control region refers to a region corresponding to a group of a plurality of mutually adjacent subpixels to be visually recognized by one of user's eyes through one light transmitting region 62 of the parallax barrier 6.

For example, when the position of the left eye corresponds to a control region "7", the left eye visually recognizes the subpixels P7 to P12. At this time, the controller 7 drives the subpixels P7 to P12 to display the left eye image. During the time when the position of the left eye is being maintained at the control region "7", the subpixels P7 to P12 remain as the subpixels driven to display the left eye image by the controller 7. When the position of the left eye is displaced from the control region "7" so as to move beyond the control boundary between the control region "7" and a control region "6", then less than one-half of the subpixel P7, the whole of the subpixels P8 to P12, and one-half or more of the subpixel P1 become subpixels visually recognized by the left eye. At this time, the controller 7 is configured to drive the subpixels P8 to P12 and P1 to display the left eye image. Likewise, the controller 7 is configured to drive at least some of the subpixels to change the displayed image when the position of the right eye is displaced so as to move beyond a control boundary.

Figure 14:
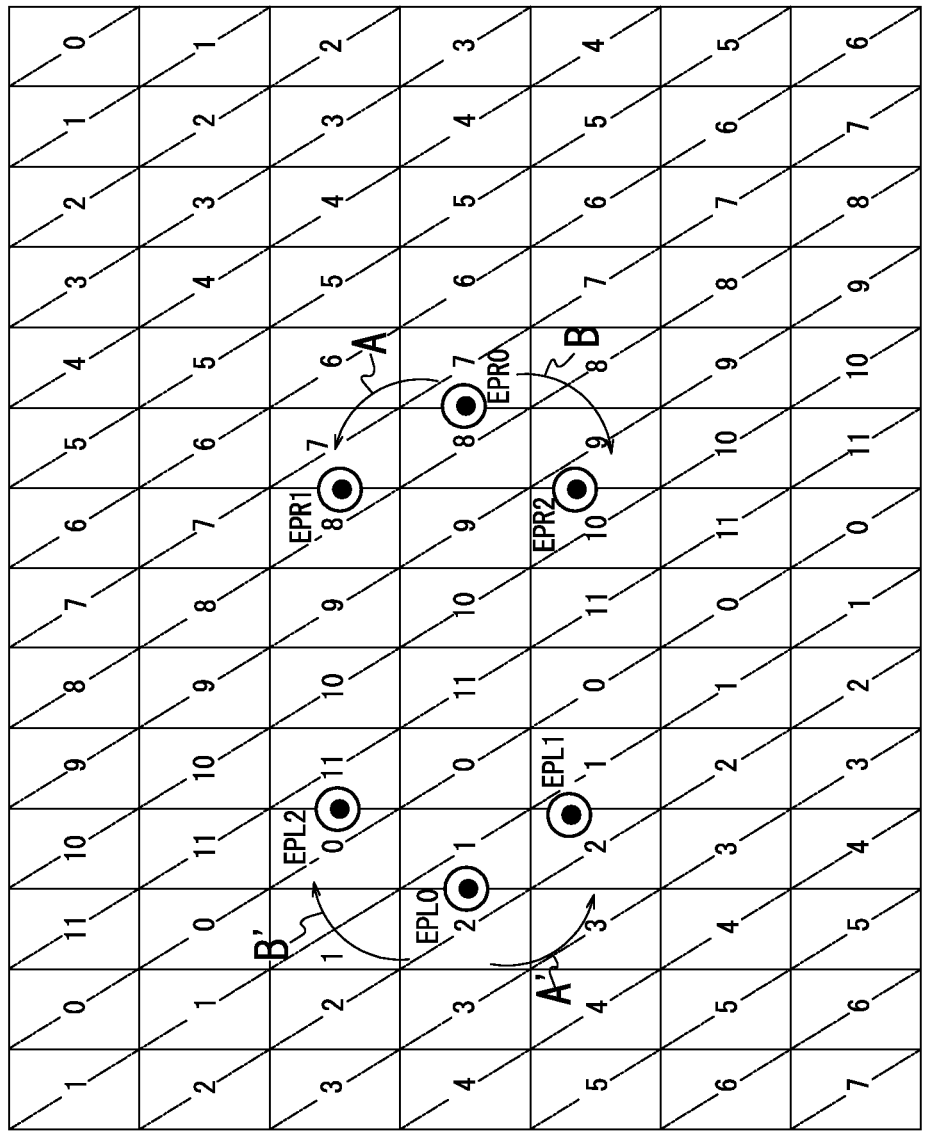
FIG. 14 is a view showing the control boundary shown in FIG. 13, as viewed in the depth-wise direction.

As described above, in this embodiment, the dimming face 61 and the light transmitting region 62 of the parallax barrier 6 extend in a direction forming a predetermined non-zero angle with respect to the vertical direction. Thus, as shown in FIG. 14, each control boundary extends in parallel with the boundary of the dimming face 61 and the light transmitting region 62. On average, the distance traveled by the right eye rotating at a certain angle in a direction shown by the arrow A without crossing the control boundary indicated by alternate long and short dashed lines is longer than the distance traveled by the right eye rotating at the same angle in a direction shown by the arrow B opposite to the direction of the arrow A without crossing the control boundary. The rotation of the eye in the direction of the arrow A is a rotation such that a straight line passing through the right eye standard position EPR0 and the right eye displaced position EPR1 approaches parallelism with the control boundary. The rotation of the eye in the direction of the arrow B is a rotation such that a straight line passing through the right eye standard position EPR0 and the right eye displaced position EPR2 approaches perpendicularity to the control boundary. When the control boundary is inclined diagonally downward to the right, the rotation approaching perpendicularity to the control boundary is a clockwise rotation. When the control boundary is inclined diagonally downward to the right, the rotation approaching parallelism with the control boundary is a counterclockwise rotation. For the control boundary inclined diagonally downward to the left the reverse is true.

When the right eye rotates in the direction of the arrow A, the left eye rotates in a direction shown by the arrow A'. On average, the distance traveled by the left eye rotating at a certain angle in the direction of the arrow A' without crossing the control boundary indicated by alternate long and short dashed lines is longer than the distance traveled by the left eye rotating at the same angle in a direction shown by the arrow B' opposite to the direction of the arrow A' without crossing the control boundary. The rotation of the eye in the direction of the arrow A' is a rotation such that a straight line passing through the left eye standard position EPL0 and the left eye displaced position EPL1 approaches parallelism with the control boundary. The rotation of the eye in the arrow B' is a rotation such that a straight line passing through the left eye standard position ELR0 and the left eye displaced position EPL2 approaches perpendicularity to the control boundary.

Thus, when the right eye and the left eye rotate at a certain angle in the directions of the arrow A and the arrow A', respectively, on average, the number of subpixels that are driven to change the displayed image by the controller 7 is smaller than the number of subpixels that are similarly driven when the right eye and the left eye rotate at the same angle in the opposite directions.

Thus, the left eye visible region 51aL and the right eye visible region 51aR as observed when the eye arrangement direction is displaced from the horizontal direction within the range of a xz plane varies with respect to the left eye visible region 51aL and the right eye visible region 51aR as observed when the eye arrangement direction coincides with the horizontal direction. This causes the left eye visible region 51aL and the right eye visible region 51aR to be overlapped, which may result in the binocularly visible region 51aLR. The subpixel determined to be the left subpixel on the basis of the left eye visible region 51aL and the subpixel determined to be the right subpixel on the basis of the right eye visible region 51aR may be overlapped. This may lead to increased crosstalk. In this regard, the controller 7 is configured to control an image displayed by the three-dimensional display device 2 designed according to the eye arrangement direction coinciding with the horizontal direction in a manner permitting reduction in crosstalk generated when the eye arrangement direction is displaced from the horizontal direction due to the inclination of user's face in the roll direction. The following details the controller 7.

<Determination of Third Subpixel>

The controller 7 is configured to determine the third subpixel on the basis of the positions of the left eye and the right eye.

First Example

As in the above-described case, the controller 7 may be configured to determine the left eye visible region 51aL by performing computation on the position of the left eye in the horizontal and vertical directions, the gap g, the optimal viewing distance d, the location of the light transmitting region 62, and the inclination of each end of the light transmitting region 62 in the horizontal direction. As in the above-described case, the controller 7 may be configured to determine the right eye visible region 51aR by performing computation on the position of user's right eye detected by the detection device 1, the location of the barrier opening area, the gap g, and the optimal viewing distance d. Moreover, as in the above-described case, the controller 7 may be configured to determine the left subpixel and the right subpixel on the basis of the left eye visible region 51aL and the right eye visible region 51aR, respectively.

Second Example

The controller 7 may be configured to determine the left subpixel and the right subpixel on the basis of the position of the left eye in the horizontal and vertical directions and the position of the right eye in the horizontal and vertical directions, respectively, by using the fourth table stored in the memory 8. The fourth table stores the correspondence between the position of the left eye and the position of the right eye, in the horizontal and vertical directions under conditions where the inter-eye distance is the standard distance, and each of the left subpixel which is included at a predetermined rate or more in the left eye visible region 51aL on the basis of eye position and the right subpixel which is included at a predetermined rate or more in the right eye visible region 51aR on the basis of eye position.

More specifically, the controller 7 may be configured to determine that a subpixel, which is shown in the fourth table as the subpixel which is included at a predetermined rate or more in the left eye visible region 51aL in correspondence with the position of the left eye in the horizontal and vertical directions, is the left subpixel, when the detection device 1 detects the position of the left eye in the horizontal and vertical directions. Likewise, the controller 7 may be configured to determine that a subpixel, which is shown in the fourth table as the subpixel which is included at a predetermined rate or more in the right eye visible region 51aR in correspondence with the position of the right eye in the horizontal and vertical directions, is the right subpixel, when the detection device 1 detects the position of the right eye. Moreover, the controller 7 may be configured to determine a subpixel which is the left subpixel and also is the right subpixel is the third subpixel.

Third Example

The controller 7 may be configured to determine the third subpixel on the basis of the position of the left eye and the position of the right eye in the horizontal and vertical directions by using the fifth table. The fifth table is a table which indicates the correspondence between the third subpixel, and the position of the left eye in the horizontal and vertical directions and the position of the right eye in the horizontal and vertical directions.

<Determination of Fourth Subpixel>

The controller 7 may be configured to determine that a subpixel which is neither the left subpixel nor the right subpixel is the fourth subpixel. The controller 7 may be configured to determine the fourth subpixel on the basis of the positions of the left eye and the right eye by using the sixth table. The sixth table is a table which indicates the correspondence between the position of the left eye in the horizontal and vertical directions and the position of the right eye in the horizontal and vertical directions, and the fourth subpixel.

<Display of Image>

The controller 7 is configured to drive the left subpixel, the right subpixel, the third subpixel, and the fourth subpixel to display the left eye image, the right eye image, the third image, and the black image, respectively.

An example of processing procedure to be performed by the three-dimensional display device 2 when user's face is inclined in the roll direction is similar to the processing procedure shown in FIG. 11 that is performed by the three-dimensional display device 2 when the inter-eye distance is not the standard distance. When user's face is inclined in the roll direction, in Step S12 shown in FIG. 11, the controller 7 is configured to determine the left eye visible region 51aL on the basis of the position of the left eye in the horizontal and vertical directions, and then to determine the left subpixel. Moreover, in Step S13, the controller 7 is configured to determine the right eye visible region 51aR on the basis of the position of the right eye in the horizontal and vertical directions, and then to determine the right subpixel. Otherwise, the processing procedure is similar to the processing procedure to be performed by the three-dimensional display device 2 when the inter-eye distance E is not the standard distance E0.

<<In the Case where User's Face is Inclined in the Pan Direction>>

Figure 15:
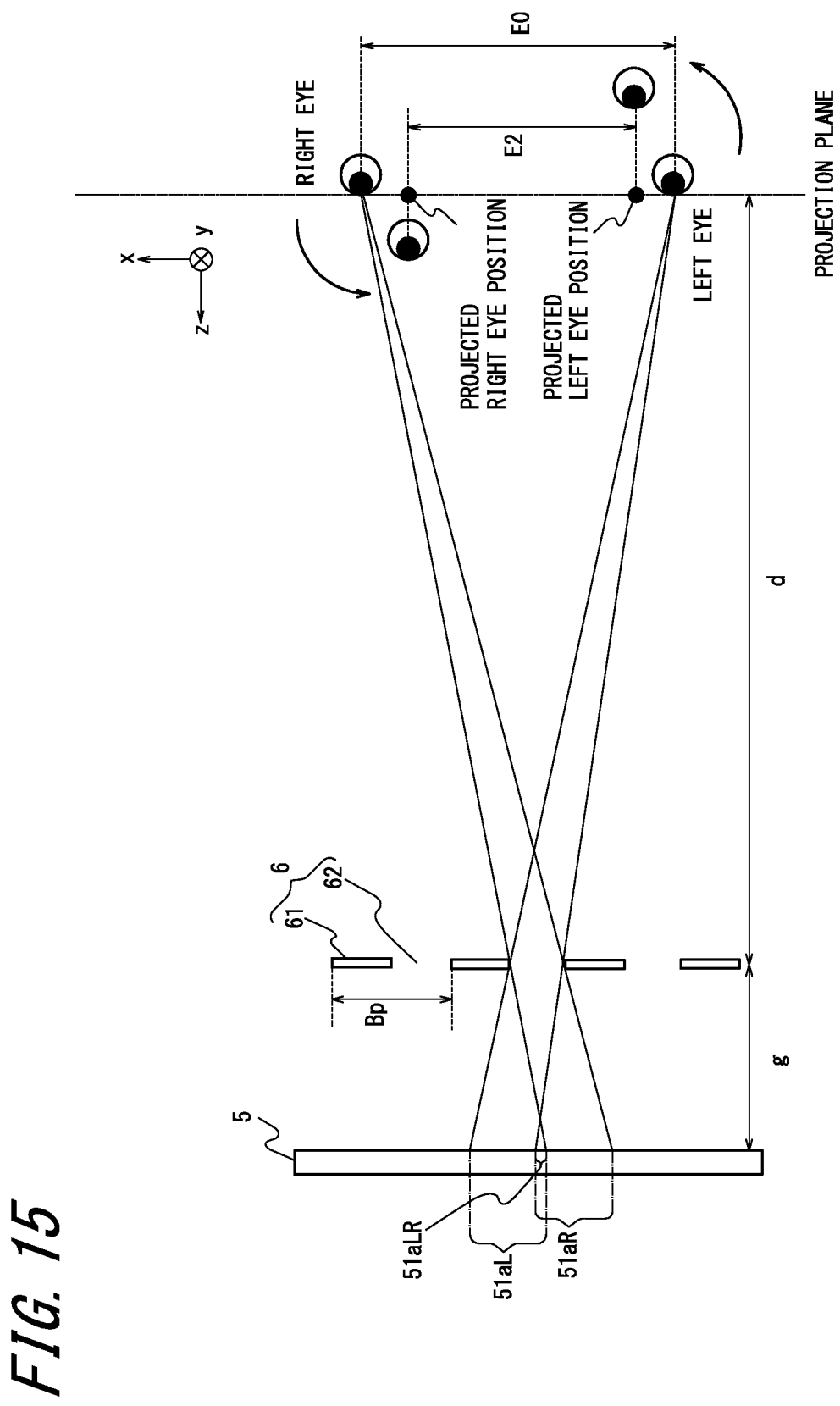
FIG. 15 is a view for illustrating display panel regions of the three-dimensional display system shown in FIG. 1 that are visually recognized by user's eyes when the eye arrangement direction is inclined in the pan direction.

As described above, the three-dimensional display device 2 is configured to allow a user to visually recognize a three-dimensional image properly on the basis of the inter-eye distance under conditions where user's right and left eyes are spaced by the optimal viewing distance d away from the parallax barrier 6. For example, as shown in FIG. 15, when user's face is inclined in the pan direction, the horizontal component of the distance between user's right eye and left eye corresponds to a value of "E2" which differs from the inter-eye distance E. The inclination of user's face in the pan direction means that the face is inclined only within the range of a plane whose normal direction is the vertical direction (xz plane) without undergoing a shift in the vertical direction (y direction). Accordingly, there may be a case where the three-dimensional display device 2 designed according to the inter-eye distance E fails to allow the user to visually recognize a three-dimensional image properly.

<Determination of Projected Left Eye Position and Projected Right Eye Position>

The controller 7 is configured to determine a projected left eye position (projected first position) which is the position of the left eye detected by the detection device 1 that is projected on a plane which is parallel to the active area 51 and is spaced by the optimal viewing distance d away from the parallax barrier 6. Moreover, the controller 7 is configured to determine a projected right eye position (projected second position) which is the position of the right eye detected by the detection device 1 that is projected on a plane which is parallel to the active area 51 and is spaced by the optimal viewing distance d away from the parallax barrier 6.

<Determination of Third Subpixel>

As in the case where the inter-eye distance is not the standard distance, the controller 7 is configured to determine the left subpixel, the right subpixel, and the third subpixel on the basis of the projected left eye position and the projected right eye position defined as the position of the left eye and the position of the right eye, respectively.

<Determination of Fourth Subpixel>

As in the case where the inter-eye distance E is not the standard distance E0, the controller 7 may be configured to determine the fourth subpixel on the basis of the subpixels determined to be the left subpixel and the right subpixel, respectively, on the basis of the projected left eye position and the projected right eye position defined as the position of the left eye and the position of the right eye, respectively. Moreover, as in the case where the inter-eye distance is not the standard distance, the controller 7 may be configured to determine the fourth subpixel on the basis of the projected left eye position defined as the position of the left eye and the projected right eye position defined as the position of the right eye by using the third table.

<Display of Image>

The controller 7 is configured to drive the left subpixel, the right subpixel, the third subpixel, and the fourth subpixel to display the left eye image, the right eye image, the third image, and the black image, respectively.

Figure 16:
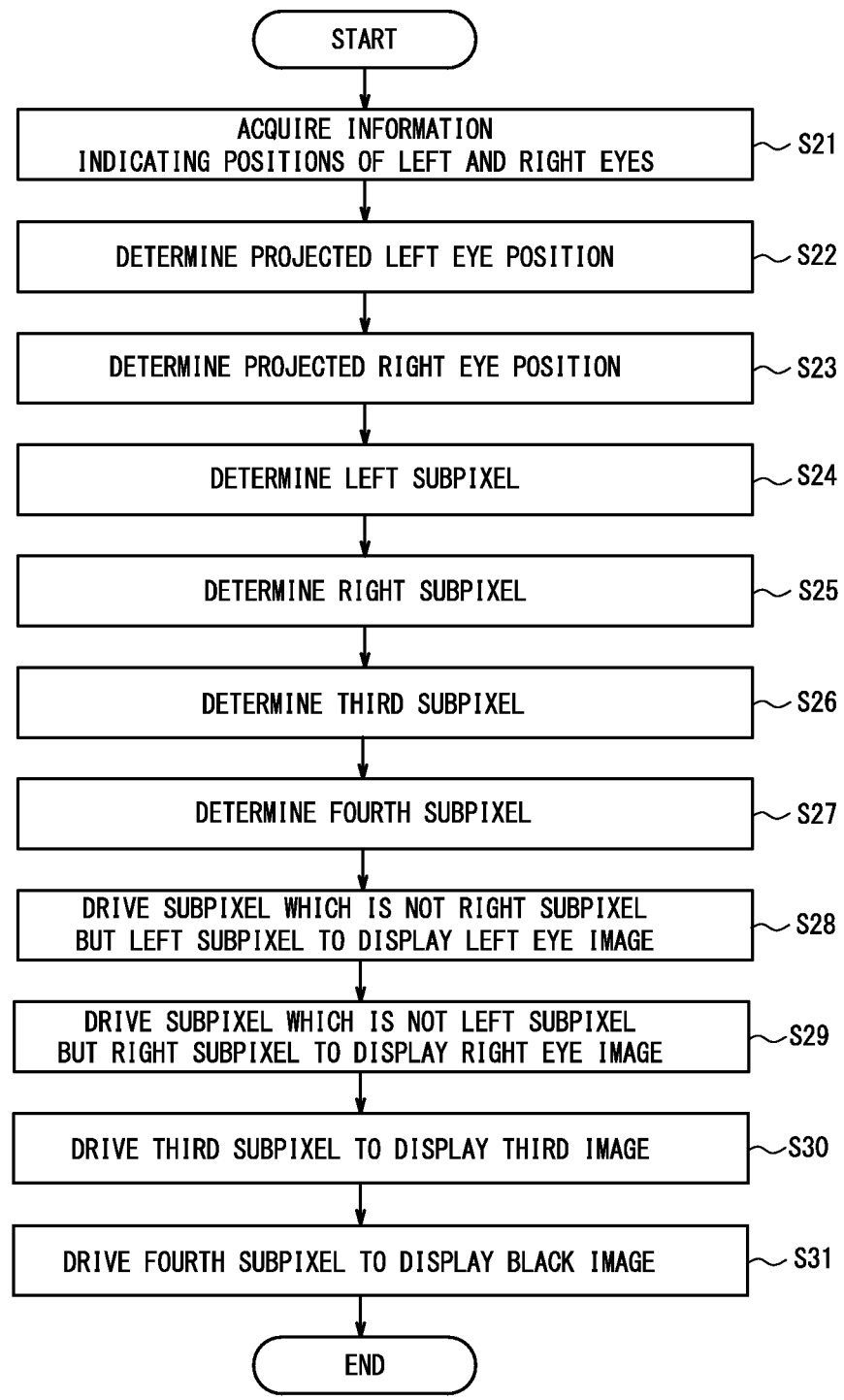
FIG. 16 is a flow chart showing an example of the flow of processing executed in the three-dimensional display device under conditions where user's face is inclined in the pan direction.

The following describes an example of processing procedure to be performed by the three-dimensional display device 21 when user's face is inclined in the pan direction with reference to FIG. 16.

The controller 7 acquires information indicating the positions of user's left eye and right eye from the detection device 1 (Step S21).

When the information is acquired in Step S21, the controller 7 determines the projected left eye position, i.e, the position of user's left eye that is projected on a plane which is spaced by the optimal viewing distance d away from the parallax barrier 6 and is parallel to the active area 51 (Step S22).

When the projected left eye position is determined in Step S22, the controller 7 determines the projected right eye position, i.e., the position of user's right eye indicated by the information acquired in Step S21 that is projected on a plane which is spaced by the optimal viewing distance d away from the parallax barrier 6 and is parallel to the active area 51 (Step S23).

When the projected right eye position is determined in Step S23, the controller 7 determines the left eye visible region 51aL on the basis of the projected left eye position determined in Step S22, and then determines the left subpixel on the basis of the left eye visible region 51aL (Step S24).

When the left subpixel is determined in Step S24, the controller 7 determines the right eye visible region 51aR on the basis of the projected right eye position determined in Step S23, and then determines the right subpixel on the basis of the right eye visible region 51aR (Step S25).

When the right subpixel is determined in Step S25, the controller 7 executes the process from Steps S26 to S31. The process from Step S26 to Step S31 is identical with the process from Step S14 to Step S19 set for the case where the inter-eye distance E is not the standard distance E0.

As described heretofore, in this embodiment, the controller 7 determines the left eye visible region 51aL on the basis of the position of the left eye, and determines the right eye visible region 51aR on the basis of the position of the right eye. Thus, the left eye visible region 51aL is not determined on the basis of the position of the right eye and the standard distance E0, but is determined on the basis of the position of the left eye. The right eye visible region 51aR is not determined on the basis of the position of the left eye and the standard distance E0, but is determined on the basis of the position of the right eye. This permits accurate determination of the region visually recognized by the right eye and the region visually recognized by the left eye even when the inter-eye distance E is not the standard distance E0.

The controller 7 is configured to determine the left subpixel and the right subpixel on the basis of the left eye visible region 51aL and the right eye visible region 51aR, respectively. The controller 7 is configured to drive the subpixel which is not the right subpixel but the left subpixel to display the left eye image, and drive the subpixel which is not the left subpixel but the right subpixel to display the right eye image. The controller 7 is configured to drive the third subpixel to display the third image. Accordingly, in the case where the inter-eye distance is not the standard distance, it is possible to carry out control an image visually recognized by both eyes of the user so as to reduce crosstalk. This allows the user to visually recognize a three-dimensional image properly.

In this embodiment, the controller 7 may be configured to determine the left subpixel in accordance with the position of the left eye by using the first table indicating the correspondence between the position of the left eye and the position of the right eye spaced by the standard distance away from the left eye, and an image intended to be displayed via subpixels. The controller 7 can determine the right subpixel on the basis of the position of the right eye by using the first table. This eliminates the need for the controller 7 to perform, at every acquisition of information indicating the position of each eye, computation for determination of the left eye visible region 51aL and the right eye visible region 51aR on the basis of the position of each eye and according to the configuration of the parallax barrier 6 and the display panel 5. Thus, the processing load on the controller 7 may be reduced.

In this embodiment, the controller 7 may be configured to display, as the third image, the left eye image or the right eye image on the binocularly visible region 51aLR according to user's characteristics. This allows user's dominant eye to see only a dominant eye-specific image, and may thus reduce user's discomfort during viewing of images.

In this embodiment, the controller 7 may be configured to display, as the third image, an image having a brightness value equivalent to the average of the brightness values of the left eye image and the right eye image. This allows user's left eye to visually recognize an image which is close in brightness to the left eye image rather than the right eye image, and allows user's right eye to visually recognize an image which is close in brightness to the right eye image rather than the left eye image. In this case, in contrast to cases where the left eye visually recognizes the right eye image or the right eye visually recognizes the left eye image, the user may enjoy viewing of images with less discomfort.

In this embodiment, the controller 7 may be configured to display, as the third image, a black image having a brightness value which is less than or equal to a predetermined value. This can avoid that the left eye and the right eye of the user visually recognize a right eye-specific image and a left eye-specific image, respectively. Thus, crosstalk can be reduced.

In this embodiment, the three-dimensional display device 2 may be provided with the memory 8 that stores the second table indicating the correspondence between the third subpixel, and the position of the left eye and the position of the right eye. The controller 7 can determine the third subpixel on the basis of the position of the left eye and the position of the right eye by using the second table. This eliminates the need for the controller 7 to perform, at every acquisition of information as to the position of each eye, computation for determination of the left eye visible region 51aL and the right eye visible region 51aR on the basis of the position of each eye and according to the configuration of the parallax barrier 6 and the display panel 5. Moreover, the controller 7 does not necessarily have to conduct processing operation to determine the left subpixel and the right subpixel on the basis of the left eye visible region 51aL and the right eye visible region 51aR, respectively. Thus, the processing load on the controller 7 may be reduced.

In this embodiment, the controller 7 is configured to drive the fourth subpixel to display the black image. Thus, no image light is emitted from the fourth subpixel. This can protect user's eyes from arrival of stray light caused by secondary reflection of image light emitted from the fourth subpixel from the members constituting the parallax barrier 6, etc. Thus, the left eye and the right eye of the user clearly visually recognize the left eye image and the right eye image, respectively, without interference from stray light.

In this embodiment, the controller 7 is configured to determine the left subpixel on the basis of the position of the left eye in the horizontal and vertical directions. Moreover, the controller 7 is configured to determine the right subpixel on the basis of the position of the right eye in the horizontal and vertical directions. Thus, even when the eye arrangement direction is not the horizontal direction, the controller 7 can reduce crosstalk during display of a three-dimensional image using the parallax barrier 6 and the display panel 5 designed according to the eye arrangement direction coinciding with the horizontal direction.

In this embodiment, the controller 7 determines the left subpixel on the basis of the projected left eye position. The controller 7 is configured to determine the right subpixel in accordance with the projected right eye position. Thus, even when the horizontal component of the inter-eye distance E does not correspond to the standard distance E0, the controller 7 can reduce crosstalk during display of a three-dimensional image using the parallax barrier 6 and the display panel 5 designed according to the standard distance E0.

Although there has been shown and described herein a certain embodiment as a representative example, it is apparent to those skilled in the art that many changes and rearrangement of parts are possible within the spirit and scope of the invention. That is, the described embodiment is not to be construed as limiting of the invention, and hence various changes and modifications may be made without departing from the scope of the appended claims. For example, a plurality of constituent blocks as shown in the embodiment or examples may be combined into one, or a single constituent block may be divided into pieces.

While, in the above-described embodiment, the controller 7 determines the left subpixel, and thereafter determines the right subpixel, this does not constitute any limitation. The controller 7 may determine the right subpixel, and thereafter determine the left subpixel.

While, in the above-described embodiment, the controller 7 carries out display of the left eye image, the right eye image, the third image, and the black image one after another in the order named, this does not constitute any limitation. The controller 7 may be configured to carry out display of the left eye image, the right eye image, the third image, and the black image in any order. The controller 7 may be configured to carry out concurrent display of two or more of the left eye image, the right eye image, the third image, and the black image.

While, in the above-described embodiment, the controller 7 is configured to determine the fourth subpixel on the basis of the left eye visible region 51aL and the right eye visible region 51aR and then drive the fourth subpixel to display the black image, this does not constitute any limitation. For example, the controller 7 may be configured to drive the left subpixel, the right subpixel, and the third subpixel to display the left eye image, the right eye image, and the third image, respectively, and drive a subpixel which is not involved in display of any of the aforenamed images to display the black image.

Figure 17:
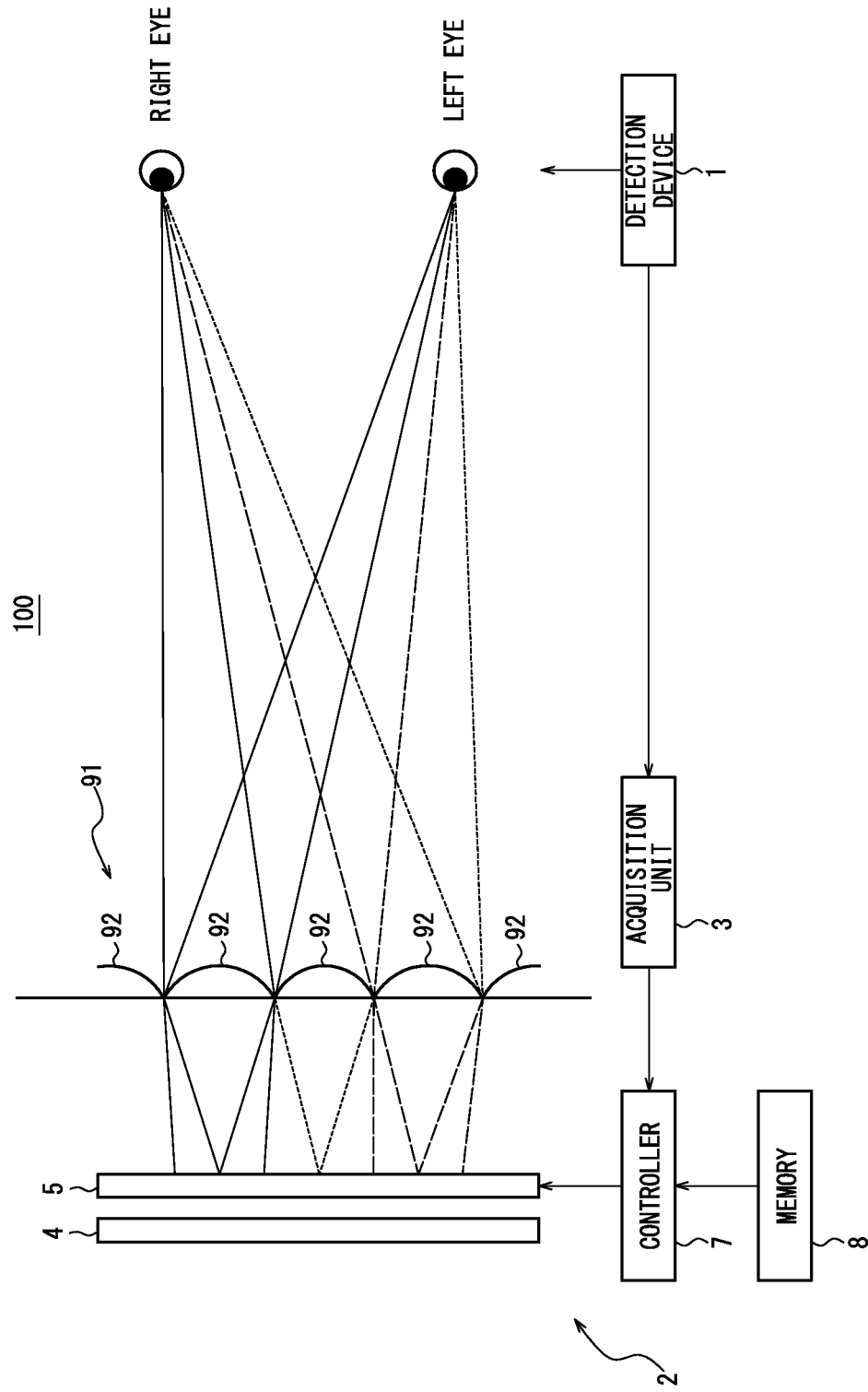
FIG. 17 is a schematic diagram of the three-dimensional display device using a lenticular lens as an optical element.

While, in the above-described embodiment, the optical element is the parallax barrier 6, this does not constitute any limitation. For example, as shown in FIG. 17, a lenticular lens 91 may be used as the optical element provided in the three-dimensional display device 2. The lenticular lens 91 is constructed of a horizontal arrangement of a plurality of vertically extending cylindrical lenses 92. Like the parallax barrier 6, the lenticular lens 91 enables image light emitted from the subpixel in the left eye visible region 51aL to reach the position of user's left eye. Moreover, the lenticular lens 91 enables image light emitted from the subpixel in the right eye visible region 51aR to reach the position of user's right eye.

Figure 18:
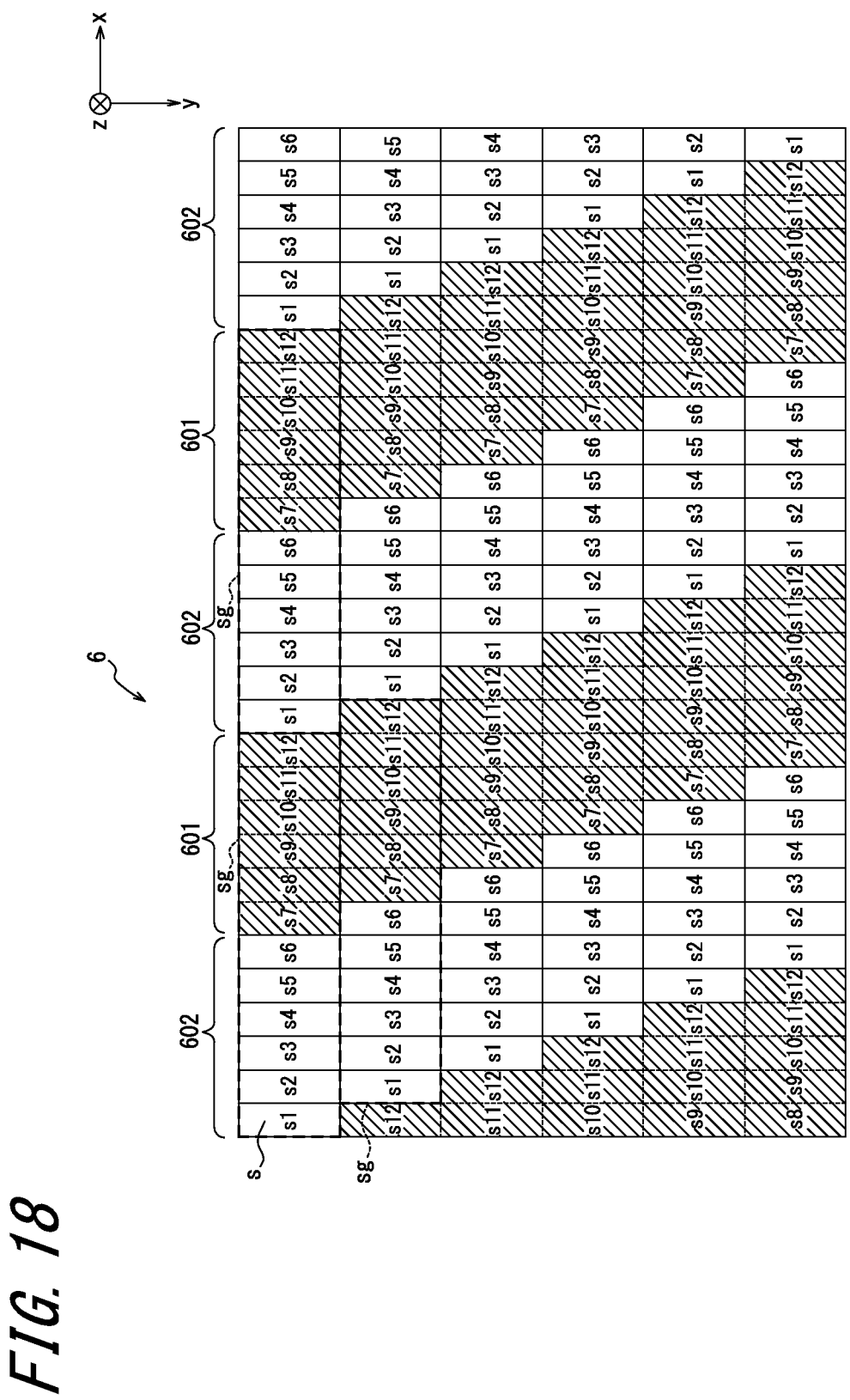
FIG. 18 is a view showing a parallax barrier according to another embodiment, as viewed in the depth-wise direction.

In the above-described embodiment, the three-dimensional display device 2 includes the parallax barrier 6 with a plurality of light transmitting regions 62 each in the form of a strip-shaped region extending in a predetermined direction within the plane, the parallax barrier 6 defining the light beam direction, i.e. the propagation direction of image light emitted from the subpixel, on a light transmitting region-by-light transmitting region basis. Alternatively, for example, the three-dimensional display device 2 may be provided with a parallax barrier 60 including a matrix with horizontal and vertical rows of a plurality of barrier regions s arranged in grid form as shown in FIG. 18.

The parallax barrier 60 may be constructed of a liquid crystal shutter. In this construction, light transmittance in each barrier region s may be adjusted in response to changes in the voltage applied to each barrier region s under the control of a controller 8. The controller 8 is configured to adjust some of a plurality of the barrier regions s to a light-transmittable state. This enables part of the parallax barrier 60 to become a light transmitting region 602. Moreover, the controller 8 is configured to adjust the rest of the plurality of barrier regions s to a dimming state. This enables the rest of the parallax barrier 60 to become a dimming region 601.

The plurality of barrier regions s provided in the parallax barrier 60 constitute a barrier region group sg. The barrier region group sg includes a predetermined number of barrier regions arranged in horizontal and vertical rows. More specifically, in conformity with the arrangement of subpixels constituting the subpixel group Pg, the barrier region group sg is configured to include (2×n×b) barrier regions s1 to s(2×n×b) consecutively arranged in the form of a b (vertical) by 2×n (horizontal) barrier region matrix. The barrier region group sg is arranged repetitively in the horizontal direction. In the vertical direction, the barrier region group sg is configured to be arranged repetitively in a manner such that vertically arranged barrier region groups are offset in the horizontal direction with respect to one another by a distance corresponding to one barrier region.

There may be provided the barrier region group sg including (2×n×b) barrier regions s1 to s(2×n×b) consecutively arranged in the form of a b (vertical) by 2×n (horizontal) barrier region matrix. In FIG. 18, n equals 6, and b equals 1. Some of the barrier region groups sg are marked with a reference character. Alternatively, the barrier region group sg may be configured to include (2×n'×b') barrier regions s1 to s(2×n'×b') consecutively arranged in the form of a b' (b'≠b) (vertical) by 2×n' (n'≠n) (horizontal) barrier region matrix.

Thus constructed, like the parallax barrier 6, the parallax barrier 60 defines the light beam direction, i.e. the propagation direction of image light emitted from the subpixel as shown in FIG. 1. Image light emitted from some subpixels in an active area A passes through the light transmitting region 602 and travels to user's left eye. Image light emitted from some other subpixels in the active area A passes through the light transmitting region 602 and travels to user's right eye.

Figure 19:
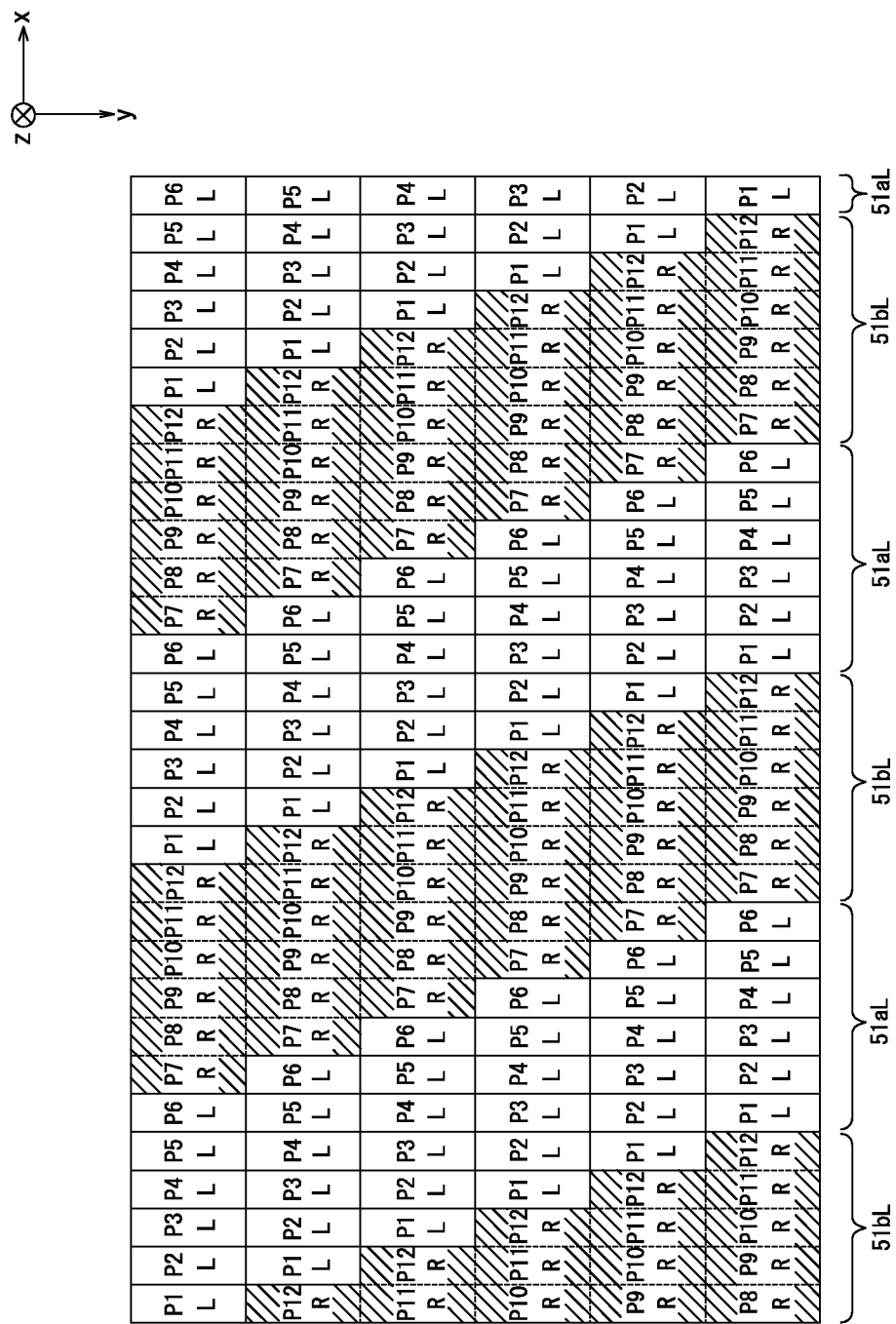
FIG. 19 is a view for illustrating the left eye visible region on the display panel used with the parallax barrier shown in FIG. 18.
Figure 20:
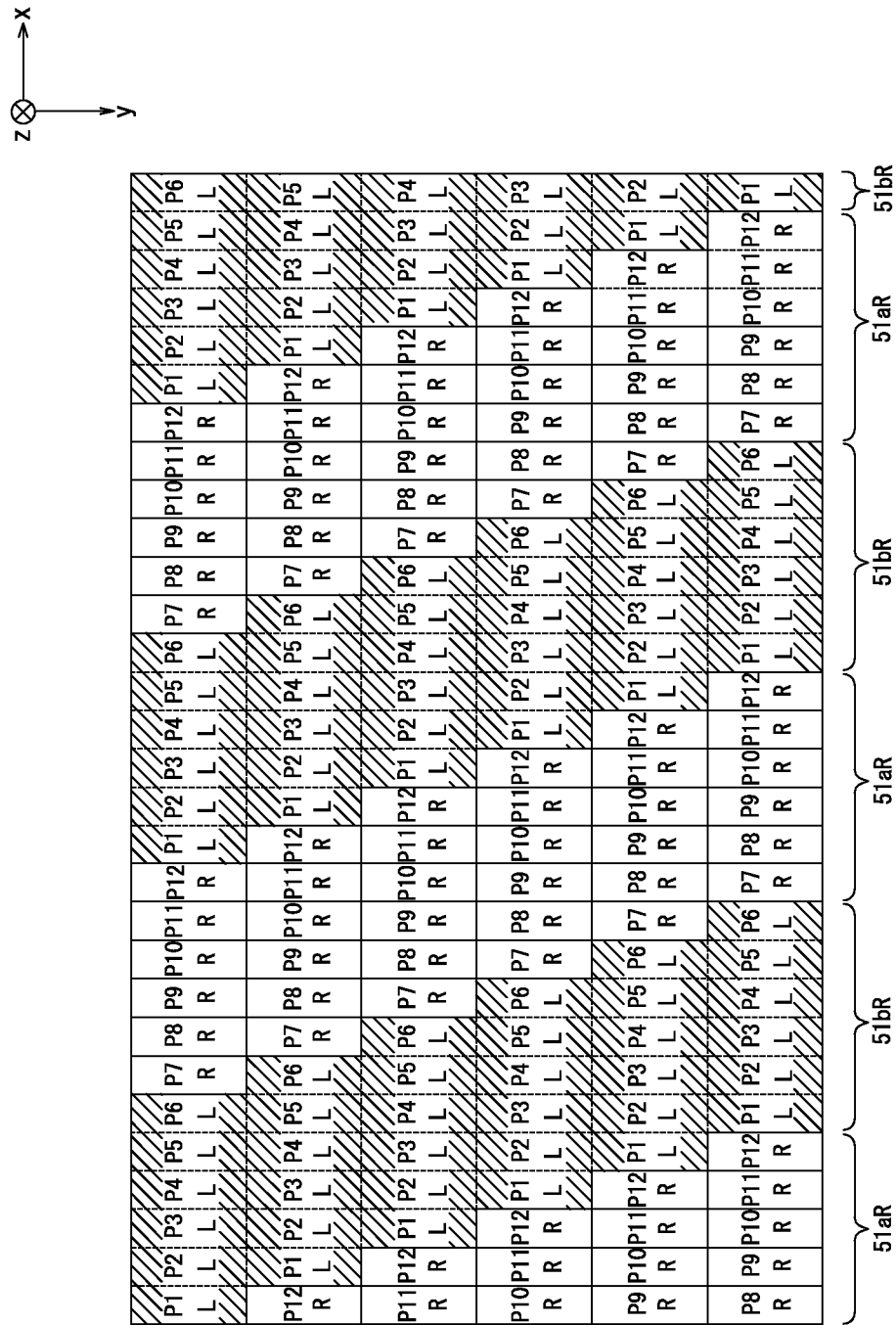
FIG. 20 is a view for illustrating the right eye visible region on the display panel used with the parallax barrier shown in FIG. 18.

The controller 19 is configured to cause the left eye visible region 51aL to display the left eye image, and cause the right eye visible region 51aR to display the right eye image. Thus, as shown in FIG. 19, user's left eye visually recognizes the left eye image readily, yet is less likely to visually recognize the right eye image. Moreover, as shown in FIG. 20, user's right eye visually recognizes the right eye image readily, yet is less likely to visually recognize the left eye image.

The following describes the visible region 51a based on the position of each eye in the display panel 5 of the three-dimensional display device 2 including the parallax barrier 60.

Figure 21:
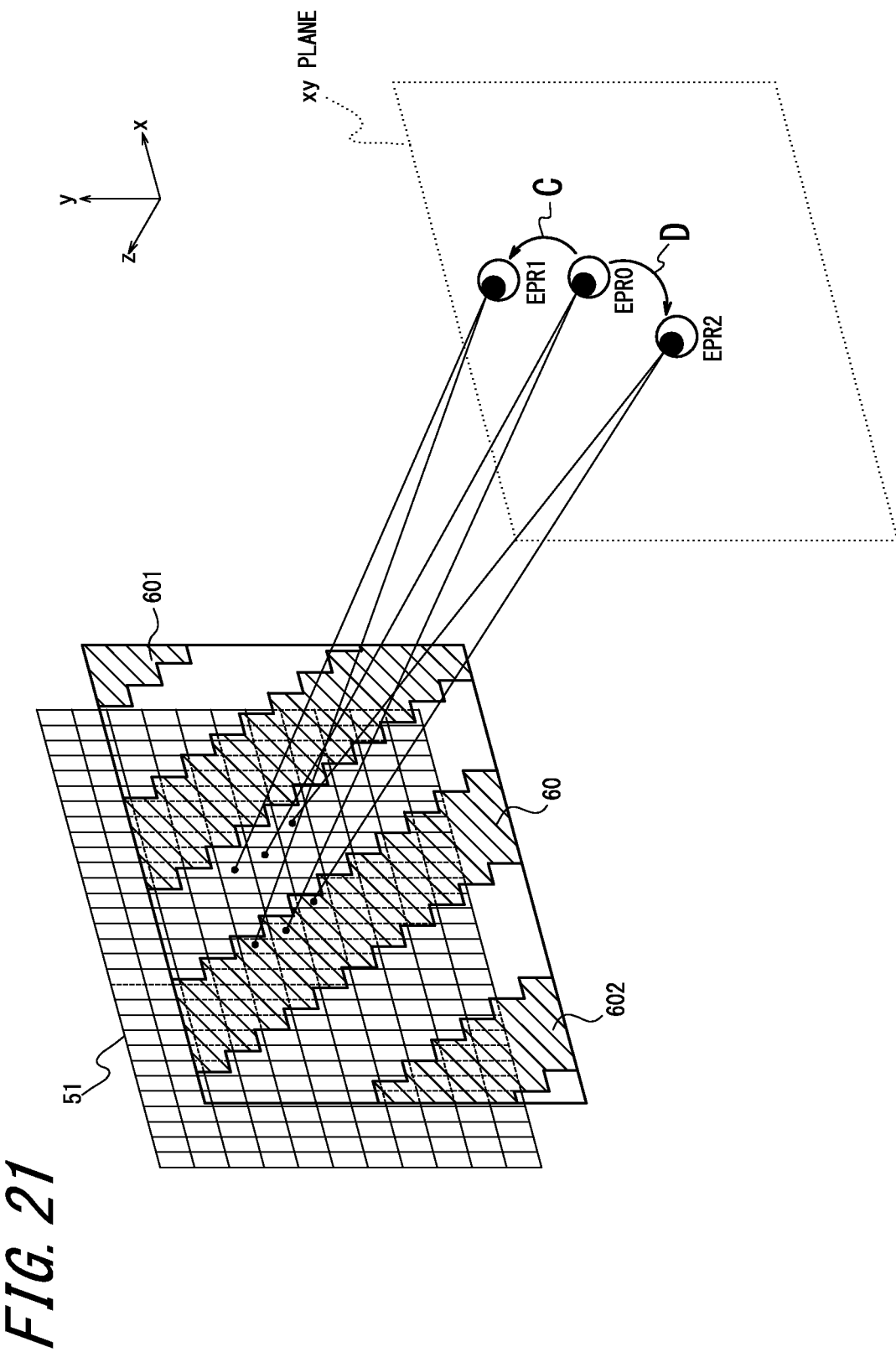
FIG. 21 is a view for illustrating a visible region as observed when the eye is displaced so as to move beyond the control boundary for the case of using the parallax barrier shown in FIG. 18.

The light transmitting region 602 is configured by some consecutively arranged barrier regions s within the barrier region group sg which is arranged repetitively in the horizontal direction, and is, in the vertical direction, arranged repetitively in a manner such that vertically arranged barrier region groups are offset in the horizontal direction with respect to one another by a distance corresponding to one barrier region. Thus, as shown in FIG. 21, the position of each end of the light transmitting region 602 in the horizontal direction varies according to eye position in the vertical direction. Accordingly, vertical displacement of the right eye causes the right eye visible region 51aR to vary. Likewise, vertical displacement of the left eye causes the left eye visible region 51aL to vary. Hence, the right eye visible region 51aR is determined on the basis of the position of the right eye in the horizontal and vertical directions. Likewise, the left eye visible region 51aL is determined on the basis of the position of the left eye in the horizontal and vertical directions.

Figure 22:
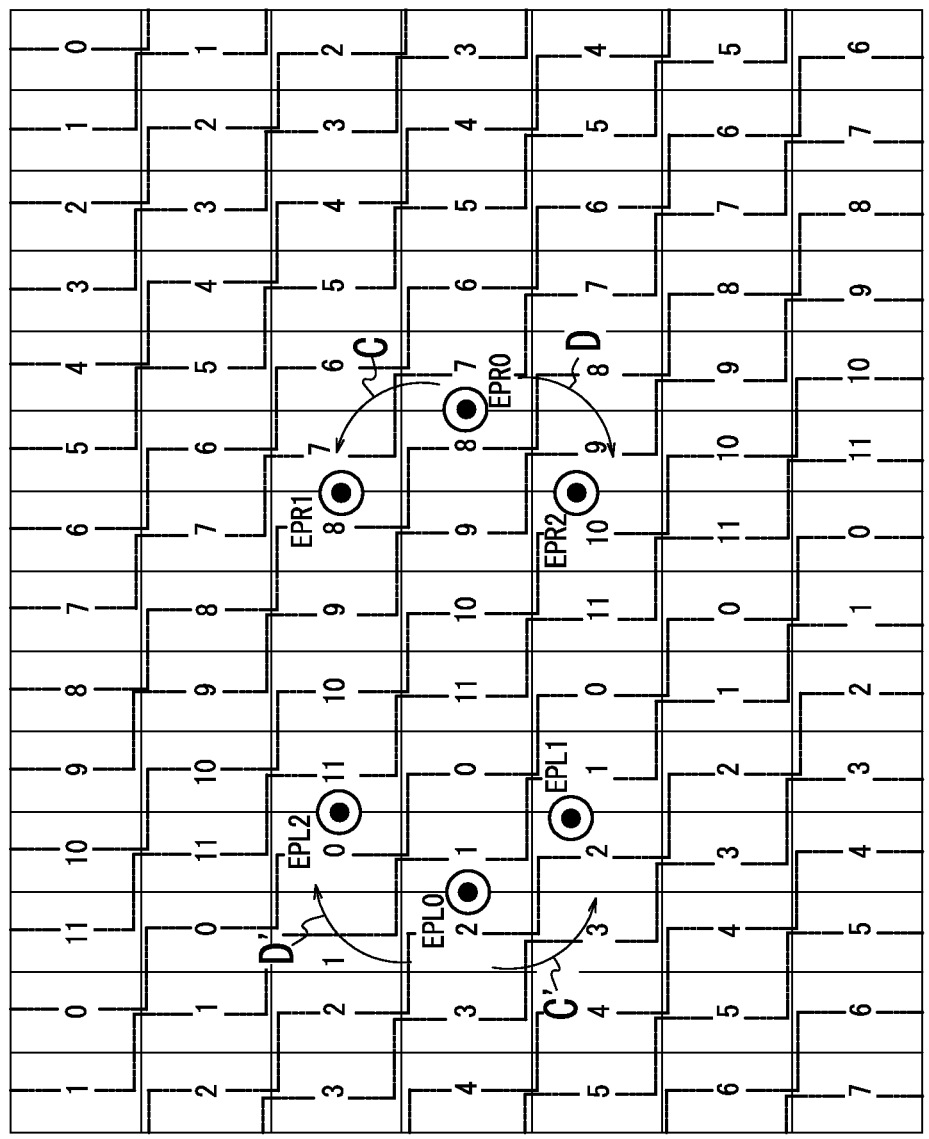
FIG. 22 is a view showing the control boundary as viewed in the depth-wise direction for the case of using the parallax barrier shown in FIG. 18.

In the three-dimensional display system 2 including the parallax barrier 60, as indicated by alternate long and short dashed lines in FIG. 22, the control boundary is defined by a repetitive pattern of lines each extending vertically by a length corresponding to the vertical length of one subpixel and further extending vertically by a length corresponding to the vertical length of the next subpixel in the vertical direction, which is offset from the one subpixel in the horizontal direction by a distance corresponding to one subpixel. In FIG. 22, the portions of the control boundaries corresponding to respective vertically arranged subpixels are shown as being at slightly different horizontal positions for easy reference. However, in reality, the portions of the control boundaries corresponding to respective vertically arranged subpixels are at the same horizontal position.

Thus, on average, the distance traveled by the right eye rotating at a certain angle in a direction shown by the arrow C without crossing the control boundary indicated by alternate long and short dashed lines is longer than the distance traveled by the right eye rotating at the same angle in a direction shown by the arrow D opposite to the direction of the arrow C without crossing the control boundary. The rotation of the eye in the direction of the arrow C is a rotation such that a straight line passing through the right eye standard position EPR0 and the right eye displaced position EPR1 approaches parallelism with the direction of a line connecting the centers of the barrier panels s arranged in columns constituting the light transmitting region 602. The rotation of the eye in the direction of the arrow D is a rotation such that a straight line passing through the right eye standard position EPR0 and the right eye displaced position EPR2 approaches perpendicularity to the direction of a line connecting the centers of the barrier panels s arranged in columns constituting the light transmitting region 602.

When the right eye rotates in the direction of the arrow C, the left eye rotates in a direction shown by the arrow C'. On average, the distance traveled by the left eye rotating at a certain angle in the direction of the arrow C' without crossing the control boundary indicated by alternate long and short dashed lines is longer than the distance traveled by the left eye rotating at the same angle in a direction shown by the arrow D' opposite to the direction of the arrow C' without crossing the control boundary. The rotation of the eye in the direction of the arrow C' is a rotation such that a straight line passing through the left eye standard position EPL0 and the left eye displaced position EPL1 approaches parallelism with the control boundary. The rotation of the eye in the direction of the arrow D' is a rotation such that a straight line passing through the left eye standard position ELR0 and the left eye displaced position EPL2 approaches perpendicularity to the control boundary.

In this construction, as in the preceding embodiment of the three-dimensional display device 2 including the parallax barrier 6, the controller 7 may be configured to determine the third subpixel 7, then determine the fourth subpixel, and effect image display when user's face is inclined in the roll direction. In this case, when the right eye and the left eye rotate at a certain angle in the directions of the arrow C and the arrow C', respectively, on average, the number of subpixels that are driven to change the displayed image by the controller 7 is smaller than the number of subpixels that are similarly driven when the right eye and the left eye rotate at the same angle in the opposite directions.

Also in this construction, when the inter-eye distance is not the standard distance and when user's face is inclined in pan direction, the controller 7 can carry out the same control as carried out in the preceding embodiment of the three-dimensional display device 2 including the parallax barrier 6.

Figure 23:
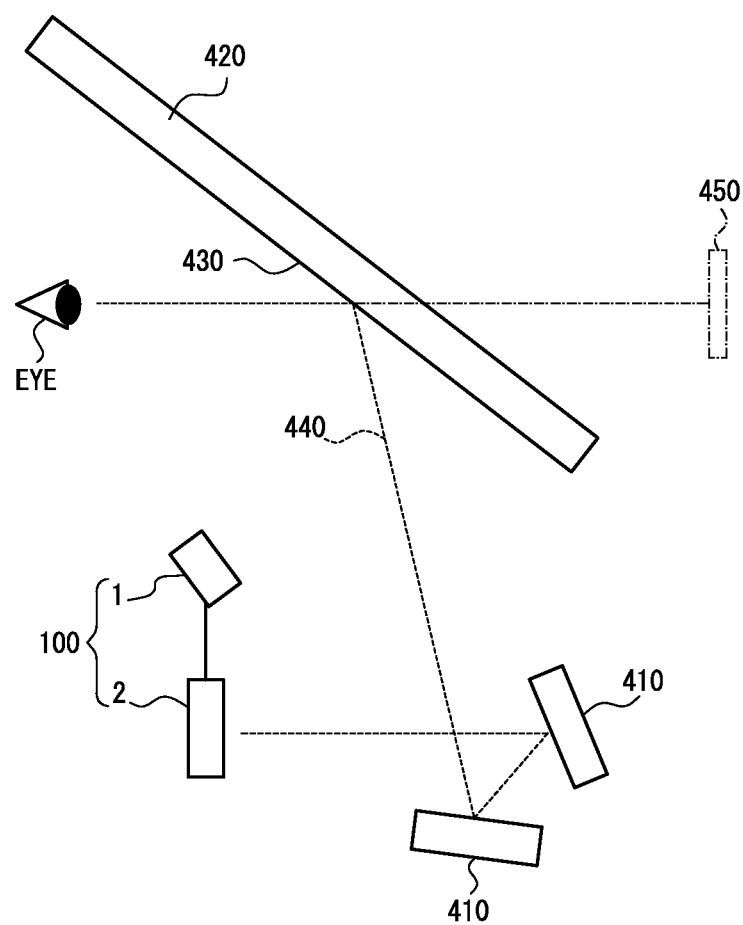
FIG. 23 is a view showing an example of an HUD incorporating the three-dimensional display system according to the embodiment.

As shown in FIG. 23, the three-dimensional display system 100 may be installed in a head-up display system 400. The head-up display system 400 is also referred to as "HUD (Head Up Display) 400". The HUD 400 includes the three-dimensional display system 100, an optical member 410, and a member for projection 420 including a plane of projection 430. The HUD 400 enables image light emitted from the three-dimensional display system 100 to travel via the optical member 410 to the member for projection 420. The HUD 400 enables the image light reflected from the member for projection 420 to reach the left and right eyes of a user. That is, the HUD 400 enables image light from the three-dimensional display system 100 to travel along an optical path 440 indicated by dashed lines to user's left and right eyes. This allows the user to visually recognize a virtual image 450 resulting from the image light which has arrived at user's eyes through the optical path 440.

Figure 24:
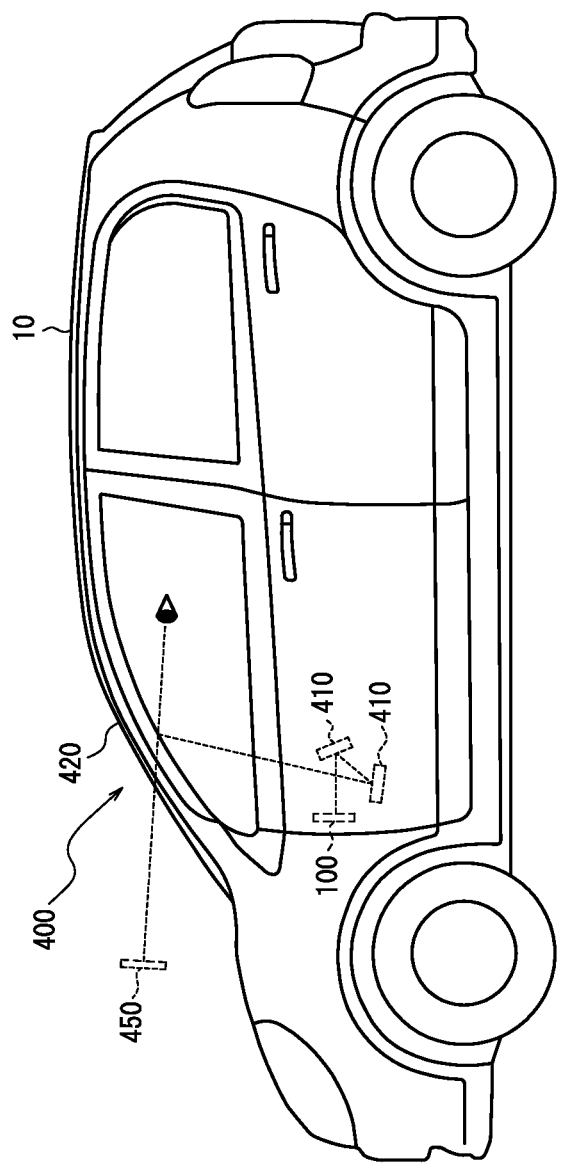
FIG. 24 is a view showing a moving body installed with the HUD shown in FIG. 18.

As shown in FIG. 24, the HUD 400 incorporating the three-dimensional display system 200 may be installed in a moving body 10. Some constituent components of the HUD 400 may be prepared by the shared use of some devices or components of the moving body 10. For example, in the moving body 10, its windshield may serve also as the member for projection 420. In the case where some constituent components of the HUD may be prepared by the shared use of some devices or components of the moving body 10, other constituent components of the HUD may be called "HUD modules" or "three-dimensional display components". The HUD 400 and the three-dimensional display system 100 may be installed in the moving body 10. The "moving body" in the disclosure includes vehicles, ships, and aircraft. The "vehicle" in the disclosure includes motor vehicles and industrial vehicles, but is not so limited, and may also include railroad vehicles, domestic vehicles, and fixed-wing airplanes that run on runways. The "motor vehicle" includes passenger automobiles, trucks, buses, motorcycles, and trolleybuses, but is not limited to them, and may also include other types of vehicles that run on roads. The "industrial vehicle" includes industrial vehicles for agriculture and industrial vehicles for construction work. The "industrial vehicle" includes forklifts and golf carts, but is not limited to them. The "industrial vehicle for agriculture" includes tractors, cultivators, transplanters, binders, combines, and lawn mowers, but is not limited to them. The "industrial vehicle for construction work" includes bulldozers, scrapers, loading shovels, crane vehicles, dump trucks, and road rollers, but is not limited to them. The "vehicle" also includes human-powered vehicles. Categorization criteria for vehicles are not limited to the foregoing. For example, the "motor vehicle" may include industrial vehicles that can run on roads, and, one and the same vehicle may be put in a plurality of categories. The "ship" as used in the disclosure includes personal watercraft, boats, and tankers. The "aircraft" as used in the disclosure includes fixed-wing airplanes and rotary-wing airplanes.

REFERENCE SIGNS LIST

1: Detection device
2: Three-dimensional display device
3: Acquisition unit
4: Irradiator
5: Display panel
6, 60: Parallax barrier
7: Controller
8: Memory
10: Moving body
51: Active area
51$a$L: Left eye visible region
51$a$R: Right eye visible region
51$b$L: Left eye non-visible region
51$b$R: Right eye non-visible region
51$a$LR: Binocularly visible region
51$b$LR: Binocularly non-visible region
61: Dimming face
62, 602: Light transmitting region
91: Lenticular lens
92: Cylindrical lens
100: Three-dimensional display system
400: Head-up display system
410: Optical member
420: Member for projection
430: Plane for projection
440: Optical path
450: Virtual image
601: Dimming region

The invention claimed is:
1. A three-dimensional display device, comprising:
a display panel comprising an active area for display of an image mixture comprising a first image and a second image which exhibits parallax with respect to the first image, the active area comprising a plurality of subpixels;
an optical element configured to define a light beam direction of image light emitted from the active area; and a controller configured to:
  acquire a position of a first eye of a user and a position of a second eye of the user, the second eye differing from the first eye; and
  drive the active area to display the image mixture based on the position of the first eye and the position of the second eye,
the controller being further configured to:
  determine a first visible region within the active area, for emitting image light which propagates to the position of the first eye,
  determine a second visible region within the active area, for emitting image light which propagates to the position of the second eye,
  determine, from among the plurality of subpixels, a first subpixel which is at least partially included in the first visible region,
  determine, from among the plurality of subpixels, a second subpixel which is at least partially included in the second visible region, and
  drive a third subpixel which is the first subpixel and also is the second subpixel, to display a third image, the third image being either only the first image or only the second image.

2. The three-dimensional display device according to claim 1, further comprising:
  a memory configured to store a first table indicating a correspondence between the position of the first eye and the position of the second eye spaced by a standard distance away from the position of the first eye, and an image intended to be displayed via the plurality of subpixels arranged in the active area,
  wherein the controller is configured to
    determine the first subpixel based on the position of the first eye by using the table, and
    determine the second subpixel based on the position of the second eye by using the table.

3. The three-dimensional display device according to claim 1,
  wherein the controller is configured to select either only the first image or only the second image as the third image based on characteristics of the user.

4. The three-dimensional display device according to claim 1, further comprising:
  a memory configured to store a table indicating a correspondence between the position of the first eye and the position of the second eye, and the third subpixel,
  wherein the controller is configured to determine the third subpixel based on the position of the first eye and the position of the second eye by using the table.

5. The three-dimensional display device according to claim 1,
  wherein the controller is configured to drive a fourth subpixel which is neither the first subpixel nor the second subpixel, to display a black image.

6. The three-dimensional display device according to claim 1,
  wherein the controller is configured to
    determine the first visible region based on the position of the first eye in a first direction which is a direction of a straight line passing through the position of a left eye of the user and the position of a right eye of the user, and
    determine the second visible region based on the position of the second eye in the first direction.

7. The three-dimensional display device according to claim 6,
  wherein the controller is configured to
    determine the first visible region based on the position of the first eye in a second direction which is parallel to the active area and is perpendicular to the first direction, and
    determine the second visible region based on the position of the second eye in the second direction.

8. The three-dimensional display device according to claim 1,
  wherein the controller is configured to display the image mixture based on a projected first position defined as the position of the first eye, and a projected second position defined as the position of the second eye, the projected first position being a position of the first eye of the user that is projected on a plane which is parallel to the active area and is spaced by an optimal viewing distance away from the optical element, the projected second position being a position of the second eye of the user that is projected on the plane.

9. A control controller comprising a processor including circuitry configured to drive an active area comprising a plurality of subpixels to display an image mixture comprising a first image and a second image which exhibits parallax with respect to the first image based on a position of a first eye of a user and a position of a second eye of the user, the second eye differing from the first eye,
  the control controller being configured to
    determine a first visible region within the active area, for emitting image light which propagates to the position of the first eye,
    determine a second visible region within the active area, for emitting image light which propagates to the position of the second eye,
    determine, from among the plurality of subpixels, a first subpixel intended to display the first image based on the first visible region,
    determine, from among the plurality of subpixels, a second subpixel intended to display the second image based on the second visible region, and
    drive a third subpixel which is the first subpixel and also is the second subpixel, to display a third image, the third image being either only the first image or only the second image.

10. A three-dimensional display method which is carried out by a three-dimensional display device, the three-dimensional display device comprising
  a display panel comprising an active area comprising a plurality of subpixels, for display of an image mixture comprising a first image and a second image which exhibits parallax with respect to the first image;
  an optical element which defines a light beam direction of image light emitted from the active area; and
  a controller configured to acquire a position of a first eye of a user and a position of a second eye of the user, the second eye differing from the first eye and drive the active area to display the image mixture based on the position of the first eye and the position of the second eye,
  the controller executing
    driving the active area to display the image mixture based on a position of a first eye of a user and a position of a second eye of the user, the second eye differing from the first eye,
    determining a first visible region within the active area, for emitting image light which propagates to the position of the first eye, determining a second visible region within the active area, for emitting image light which propagates to the position of the second eye, determining, from among the plurality of subpixels, a first subpixel intended to display the first image based on the first visible region, determining, from among the plurality of subpixels, a second subpixel intended to display the second image based on the second visible region, driving a third subpixel which is the first subpixel and also is the second subpixel, to display a third image, the third image being either only the first image or only the second image.

11. A three-dimensional display system, comprising:

a detection device configured to detect a position of a first eye of a user and a position of a second eye of the user, the second eye differing from the first eye; and a three-dimensional display device comprising a display panel comprising an active area for display of an image mixture comprising a first image and a second image which exhibits parallax with respect to the first image;

an optical element configured to define a light beam direction of image light emitted from the active area; and a controller configured to acquire a position of a first eye of a user and a position of a second eye of the user, the second eye differing from the first eye, and drive the active area to display the image mixture based on the position of the first eye and the position of the second eye, the active area comprising a plurality of subpixels, the controller being further configured to determine a first visible region within the active area, for emitting image light which propagates to the position of the first eye, determine a second visible region within the active area, for emitting image light which propagates to the position of the second eye, determine, based on the first visible region, a first subpixel intended to display the first image from among the plurality of subpixels, determine, based on the second visible region, a second subpixel intended to display the second image from among the plurality of subpixels, and drive a third subpixel which is the first subpixel and also is the second subpixel, to display a third image, the third image being either only the first image or only the second image.

12. A moving body, comprising:

a three-dimensional display device comprising a display panel comprising an active area for display of an image mixture comprising a first image and a second image which exhibits parallax with respect to the first image;

an optical element configured to define a light beam direction of image light emitted from the active area; and a controller configured to acquire a position of a first eye of a user and a position of a second eye of the user, the second eye differing from the first eye, and drive the active area to display the image mixture based on the position of the first eye and the position of the second eye, the active area comprising a plurality of subpixels, the controller being further configured to determine a first visible region within the active area, for emitting image light which propagates to the position of the first eye, determine a second visible region within the active area, for emitting image light which propagates to the position of the second eye, determine, based on the first visible region, a first subpixel intended to display the first image from among the plurality of subpixels, determine, based on the second visible region, a second subpixel intended to display the second image from among the plurality of subpixels, and drive a third subpixel which is the first subpixel and also is the second subpixel, to display a third image, the third image being either only the first image or only the second image.

13. The three-dimensional display device according to claim 1, wherein the controller is further configured to determine whether only the first image or only the second image is displayed as the third image based on whether the first eye of the user or the second eye of the user is a dominant eye of the user.

14. The control controller according to claim 9, wherein the control controller is further configured to determine whether only the first image or only the second image is displayed as the third image based on whether the first eye of the user or the second eye of the user is a dominant eye of the user.

15. The three-dimensional display method according to claim 10, wherein the controller further executes determining whether only the first image or only the second image is displayed as the third image based on whether the first eye of the user or the second eye of the user is a dominant eye of the user.

16. The three-dimensional display system according to claim 11, wherein the control controller is further configured to determine whether only the first image or only the second image is displayed as the third image based on whether the first eye of the user or the second eye of the user is a dominant eye of the user.

17. The moving body according to claim 14, wherein the controller is further configured to determine whether only the first image or only the second image is displayed as the third image based on whether the first eye of the user or the second eye of the user is a dominant eye of the user.

* * * * *